(12) United States Patent
Takahagi et al.

(10) Patent No.: US 11,258,123 B2
(45) Date of Patent: Feb. 22, 2022

(54) ALUMINIUM ALLOY FOIL WITH REDUCED CRACKING DURING MOLDING, BATTERY PACKAGING MATERIAL, AND BATTERY

(71) Applicant: DAI NIPPON PRINTING CO., LTD., Tokyo (JP)

(72) Inventors: Atsuko Takahagi, Tokyo (JP); Tatsuro Ishitobi, Tokyo (JP); Chiaki Hatsuta, Tokyo (JP); Makoto Komukai, Tokyo (JP); Mayo Sugano, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 99 days.

(21) Appl. No.: 16/472,958

(22) PCT Filed: Dec. 27, 2017

(86) PCT No.: PCT/JP2017/047074
§ 371 (c)(1),
(2) Date: Jun. 24, 2019

(87) PCT Pub. No.: WO2018/124224
PCT Pub. Date: Jul. 5, 2018

(65) Prior Publication Data
US 2019/0363312 A1    Nov. 28, 2019

(30) Foreign Application Priority Data
Dec. 28, 2016   (JP) .............................. JP2016-255180

(51) Int. Cl.
*H01M 50/116* (2021.01)
*B32B 15/08* (2006.01)
(Continued)

(52) U.S. Cl.
CPC ........... *H01M 50/116* (2021.01); *B32B 15/08* (2013.01); *B32B 15/20* (2013.01); *H01M 4/662* (2013.01)

(58) Field of Classification Search
CPC ..... H01M 50/116; H01M 4/662; B32B 15/08; B32B 15/20
(Continued)

(56) References Cited

U.S. PATENT DOCUMENTS

| | | |
|---|---|---|
| 2013/0209868 A1 | 8/2013 | Suzuta et al. |
| 2014/0242450 A1 | 8/2014 | Oono et al. |

(Continued)

FOREIGN PATENT DOCUMENTS

| | | |
|---|---|---|
| JP | 2014-65956 A | 4/2014 |
| JP | 2014-78513 A | 5/2014 |

(Continued)

OTHER PUBLICATIONS

Jul. 5, 2018 International Search Report issued in International Patent Application PCT/JP2017/047074.

*Primary Examiner* — Sean P Cullen
(74) *Attorney, Agent, or Firm* — Oliff PLC

(57) ABSTRACT

Aluminum alloy foil that, when used for battery packaging material, unlikely to develop pinholes or cracks even during molding of battery packaging material, and can exhibit excellent moldability. Aluminum alloy foil, which is for use in battery packaging material, wherein, with respect to cross section obtained by cutting aluminum alloy foil in vertical direction to rolling direction of aluminum alloy foil, which is a vertical direction to surface of aluminum alloy foil, proportion of total area of a {111} plane in total area of crystal planes of face-centered cubic structure, obtained by performing crystal analysis using EBSD method, is 10% or more; and with respect to cross section, a number average (Continued)

grain diameter R (rpm) of crystals in face-centered cubic structure, obtained by performing crystal analysis using EBSD method, satisfies following equation: number average grain diameter $R \leq 0.056X+2.0$, where X=thickness (rpm) of aluminum alloy foil.

15 Claims, 6 Drawing Sheets

(51) Int. Cl.
  *B32B 15/20* (2006.01)
  *H01M 4/66* (2006.01)

(58) Field of Classification Search
  USPC .................................................. 429/163, 176
  See application file for complete search history.

(56) References Cited

U.S. PATENT DOCUMENTS

| | | | | |
|---|---|---|---|---|
| 2015/0155531 A1* | 6/2015 | Takahagi | ............ | H01M 2/0287 |
| | | | | 429/163 |
| 2017/0274622 A1* | 9/2017 | Amano | ................... | B32B 27/30 |

FOREIGN PATENT DOCUMENTS

| | | | | | |
|---|---|---|---|---|---|
| JP | 2014088598 A | * | 5/2014 | ............. | C22C 21/02 |
| JP | 2014-130845 A | | 7/2014 | | |
| JP | 2015-203154 A | | 11/2015 | | |
| JP | 2016-156059 A | | 9/2016 | | |
| JP | 2016-157702 A | | 9/2016 | | |
| JP | 2016-216752 A | | 12/2016 | | |
| JP | 2017-8364 A | | 1/2017 | | |
| WO | WO-2012036181 A1 | * | 3/2012 | .......... | H01M 2/0285 |
| WO | WO-2013168606 A1 | * | 11/2013 | ................ | C22F 1/00 |
| WO | WO-2016047389 A1 | * | 3/2016 | ............ | B32B 27/32 |

\* cited by examiner

ALUMINIUM ALLOY FOIL WITH REDUCED CRACKING DURING MOLDING, BATTERY PACKAGING MATERIAL, AND BATTERY

TECHNICAL FIELD

The present invention relates to an aluminum alloy foil for a battery packaging material, a battery packaging material, and a battery.

BACKGROUND ART

Various types of batteries have been previously developed. In these batteries, battery elements including electrodes, an electrolyte, and the like need to be sealed with a packaging material or the like. As battery packaging materials, metallic packaging materials have been widely used.

In recent years, along with improvements in the performance of electric cars, hybrid electric cars, personal computers, cameras, mobile phones, and the like, batteries with diverse shapes have been required. Batteries have also been required to be thinner and lighter weight, for example. However, the widely used metallic packaging materials have difficulty in keeping up with the diversification of battery shapes. Moreover, because the packaging materials are made of metal, they are limited in terms of weight reduction.

Thus, a film-shaped battery packaging material in which a base material layer/an aluminum alloy foil/a heat-sealable resin layer are laminated in this order has been proposed as a battery packaging material that can be readily processed into diverse shapes, and can achieve a reduction in thickness and weight.

In such a film-shaped battery packaging material, typically, a concave portion is formed by cold forming, battery elements such as electrodes and an electrolytic solution are disposed in the space formed by the concave portion, and the heat-sealable resin layer is heat-sealed with itself. As a result, a battery in which the battery elements are housed inside the battery packaging material is obtained.

However, this battery packaging material has the disadvantage of being thinner than a metallic packaging material, and being likely to develop pinholes or cracks during molding.

As an aluminum alloy foil having improved moldability, Patent Literature 1, for example, discloses an aluminum alloy soft foil characterized by having a composition containing, in terms of % by mass, 1.4% or more and 2.0% or less of Fe and 0.15% or less of Si, with the balance being Al and incidental impurities; having an average grain diameter of 5 μm or less; and having a maximum grain diameter/average grain diameter ratio of 3.5 or less.

CITATION LIST

Patent Literature

Patent Literature 1: JP 2015-203154 A

SUMMARY OF INVENTION

Technical Problem

The present inventors have found that even if an aluminum alloy foil having a small average grain diameter, like the previous aluminum alloy foil as disclosed in Patent Literature 1, is used for a battery packaging material, as a result of evaluation of its moldability, the aluminum alloy foil cannot exhibit the recently required high moldability, and may develop pinholes, cracks, and the like. That is, it has been revealed that merely using an aluminum alloy foil having a small average grain diameter cannot lead to sufficiently high moldability as recently required in a battery packaging material.

The present invention has been made in view of the foregoing prior art problem. That is, it is a main object of the present invention to provide an aluminum alloy foil that, when used for a battery packaging material, is unlikely to develop pinholes or cracks even during molding of the battery packaging material, and can exhibit excellent moldability. It is another object of the present invention to provide a battery packaging material obtained using the aluminum alloy foil, and a battery obtained using the battery packaging material.

Solution to Problem

The inventors of the present invention conducted extensive research to solve the aforementioned problem. As a result, the inventors have found that when the following aluminum alloy foil is used for a battery packaging material, it is unlikely to develop pinholes or cracks during molding of the battery packaging material, and can exhibit excellent moldability: an aluminum alloy foil wherein, with respect to a cross section obtained by cutting the aluminum alloy foil in a vertical direction to a rolling direction of the aluminum alloy foil, which is a vertical direction to a surface of the aluminum alloy foil, a proportion of a total area of a {111} plane in a total area of crystal planes of a face-centered cubic structure, obtained by performing crystal analysis using an EBSD method, is 10% or more; and with respect to the cross section, a number average grain diameter R (μm) of crystals in the face-centered cubic structure, obtained by performing crystal analysis using the EBSD method, satisfies the following equation:

$$\text{number average grain diameter } R \leq 0.056X + 2.0,$$

where X=thickness (μm) of the aluminum alloy foil.

Specifically, the inventors have found that the moldability of an aluminum alloy foil is not improved merely by reducing the average grain diameter thereof, but rather, the following aluminum alloy foil exhibits excellent moldability when used for a battery packaging material: an aluminum alloy foil wherein, with respect to a cross section obtained by cutting the aluminum alloy foil in a vertical direction to a rolling direction of the aluminum alloy foil, which is a vertical direction to a surface of the aluminum alloy foil, a proportion of a total area of a {111} plane in a total area of crystal planes of a face-centered cubic structure, obtained by performing crystal analysis using an EBSD method, for crystal planes of aluminum aligned parallel to the cross section, is 10% or more; and a number average grain diameter of crystals in the face-centered cubic structure obtained from the cross section and the thickness of the aluminum alloy foil satisfy a specific relationship.

With respect to the cross section, the {111} plane aligned parallel to the cross section is synonymous with <111>//RD. As used herein, <111>//RD means that the <111> orientation of the aluminum alloy foil containing the face-centered cubic (FCC) structure is parallel to the rolling direction (RD).

The present invention has been completed as a result of further research based on these findings.

In summary, the present invention provides aspects of invention as itemized below:

Item 1. An aluminum alloy foil for a battery packaging material, the aluminum alloy foil being for use in the battery packaging material, wherein with respect to a cross section obtained by cutting the aluminum alloy foil in a vertical direction to a rolling direction of the aluminum alloy foil, which is a vertical direction to a surface of the aluminum alloy foil, a proportion of a total area of a {111} plane in a total area of crystal planes of a face-centered cubic structure, obtained by performing crystal analysis using an EBSD method, is 10% or more; and with respect to the cross section, a number average grain diameter R (μm) of crystals in the face-centered cubic structure, obtained by performing crystal analysis using the EBSD method, satisfies the following equation:

number average grain diameter $R \leq 0.056X+2.0$, where X=thickness (μm) of the aluminum alloy foil.

Item 2. The aluminum alloy foil for a battery packaging material according to item 1, wherein the proportion (%) of the total area of the {111} plane in the total area of crystal planes of the face-centered cubic structure satisfies the following equation:

proportion (%) of the total area of the {111} plane in the total area of crystal planes of the face-centered cubic structure$\geq -1.1X+66$, where X=thickness (μm) of the aluminum alloy foil.

Item 3. The aluminum alloy foil for a battery packaging material according to item 1 or 2, wherein a standard deviation St of the grain diameter satisfies the following equation:

standard deviation St of the grain diameter$\leq 0.09X+0.5$, where X=thickness (μm) of the aluminum alloy foil.

Item 4. The aluminum alloy foil for a battery packaging material according to any one of items 1 to 3, comprising iron.

Item 5. The aluminum alloy foil for a battery packaging material according to any one of items 1 to 4, comprising, on a surface thereof, an acid resistance film containing at least one element selected from the group consisting of phosphorus, chromium, and cerium.

Item 6. The aluminum alloy foil for a battery packaging material according to any one of items 1 to 4, comprising, on a surface thereof, an acid resistance film, wherein when analysis of the acid resistance film is performed using time-of-flight secondary ion mass spectrometry, a peak derived from at least one of $Ce^+$ and $Cr^+$ is detected.

Item 7. The aluminum alloy foil for a battery packaging material according to any one of items 1 to 4, comprising, on a surface thereof, an acid resistance film containing at least one selected from the group consisting of a phosphorus compound salt, a chromium compound, a fluorine compound, and a triazine-thiol compound.

Item 8. The aluminum alloy foil for a battery packaging material according to any one of items 1 to 4, comprising, on a surface thereof, an acid resistance film containing a cerium compound.

Item 9. A battery packaging material comprising a laminate comprising at least a base material layer, the aluminum alloy foil for a battery packaging material according to any one of items 1 to 8, and a heat-sealable resin layer in this order.

Item 10. A battery comprising a battery element comprising at least a positive electrode, a negative electrode, and an electrolyte, the battery element being housed in a packaging material formed of the battery packaging material according to item 9.

Advantageous Effects of Invention

The present invention can provide an aluminum alloy foil that, when used for a battery packaging material, is unlikely to develop pinholes or cracks during molding of the battery packaging material, and can exhibit excellent moldability. The present invention can also provide a battery packaging material obtained using the aluminum alloy foil, and a battery obtained using the battery packaging material.

DESCRIPTION OF EMBODIMENTS

The aluminum alloy foil of the present invention is for use in a battery packaging material. Furthermore, the aluminum alloy foil of the present invention is characterized in that, with respect to a cross section obtained by cutting the aluminum alloy foil in a vertical direction to a rolling direction of the aluminum alloy foil, which is a vertical direction to a surface of the aluminum alloy foil, a proportion of a total area of a {111} plane in a total area of crystal planes of a face-centered cubic structure (hereinafter, "a proportion of a total area of a {111} plane in a total area of crystal planes of a face-centered cubic structure" may be abbreviated as the "proportion of the total area of the {111} plane"), obtained by performing crystal analysis using an EBSD method, is 10% or more; and with respect to the cross section, a number average grain diameter R (μm) of crystals in the face-centered cubic structure, obtained by performing crystal analysis using the EBSD method, satisfies the following equation:

number average grain diameter $R \leq 0.056X + 2.0$, where X=thickness (μm) of the aluminum alloy foil.

With reference to FIGS. 1A to 13, the aluminum alloy foil of the present invention, a battery packaging material obtained using the aluminum alloy foil, and a battery obtained using the battery packaging material will be hereinafter described in detail.

In the present invention, the EBSD (Electron BackScattered Diffraction Pattern) method is a method that uses an EBSD detector, which is one of the detectors incorporated into a scanning electron microscope (SEM); this method captures a Kikuchi pattern derived from an electron backscattered diffraction pattern by means of an EBSD detector screen, and analyzes the pattern, thereby measuring microscopic crystal orientations of a crystal sample. In the present specification, any numerical range indicated by " . . . to . . . " is intended to mean " . . . or more" and " . . . or less". For example, the recitation "2 to 15 mm" is intended to mean 2 mm or more and 15 mm or less.

1. Aluminum Alloy Foil

An aluminum alloy foil 1 of the present invention is used for a battery packaging material. Specifically, the aluminum alloy foil of the present invention is used for a film-shaped battery packaging material formed of a laminate, and serves as a barrier layer to improve the strength of the battery packaging material, as well as prevent the ingress of water vapor, oxygen, light, and the like into the battery. A specific example of the battery packaging material obtained using the aluminum alloy foil of the present invention will be described below.

Figure 1A:
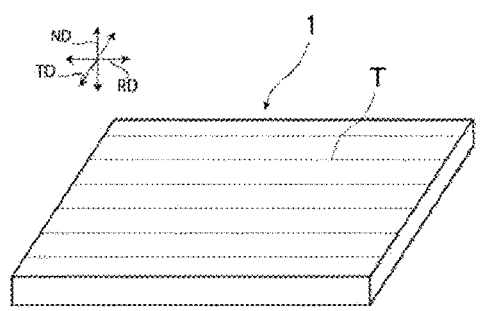
FIG. 1A is a schematic diagram of an aluminum alloy foil according to the present invention.
Figure 1B:
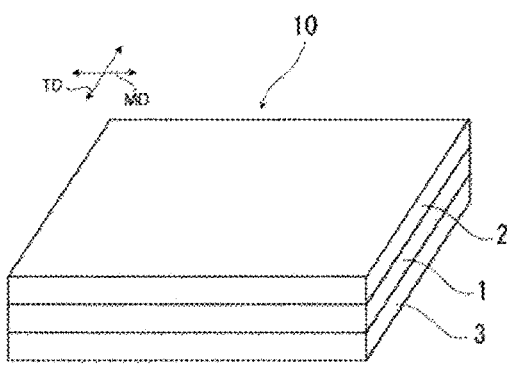
FIG. 1B is a schematic diagram of a battery packaging material according to the present invention.
Figure 2:
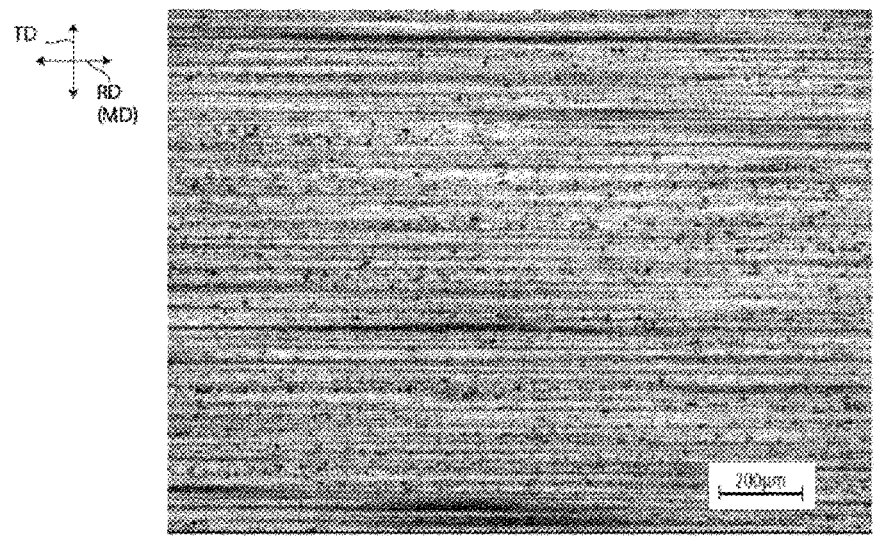
FIG. 2 is a photograph obtained by observing the glossy surface of a commercially available aluminum alloy foil (SUN FOIL from Toyo Aluminium K.K.) with a metallurgical microscope (100× magnification).

In the present invention, with respect to a cross section obtained by cutting the aluminum alloy foil in the vertical direction to the rolling direction of the aluminum alloy foil, which is the vertical direction to the surface of the aluminum alloy foil, the proportion of the total area of the {111} plane in the total area of crystal planes of a face-centered cubic structure, obtained by performing crystal analysis using the EBSD method, is 10% or more. As used herein, the rolling direction of the aluminum alloy foil 1 corresponds to RD when the aluminum alloy foil is produced through a rolling step. As shown in the schematic diagram of FIG. 1A, in the rolling direction (RD) of the aluminum alloy foil 1, linear streaks, which are so-called rolling marks, are formed on the surface of the aluminum alloy foil 1. Because the rolling marks extend along the rolling direction, the rolling direction of the aluminum alloy foil 1 can be grasped by observing the surface of the aluminum alloy foil 1. In the schematic diagrams of FIGS. 1A-1B, RD is an abbreviation of the rolling direction, TD is an abbreviation of the transverse direction, ND is an abbreviation of the normal direction, and MD is an abbreviation of the machine direction. For reference, a schematic diagram of a battery packaging material 10 (as an example, a battery packaging material including a base material layer 2 on one surface of the aluminum alloy foil 1, and a heat-sealable resin layer 3 on the other surface thereof) is also shown in FIG. 1B. RD of the aluminum alloy foil 1 shown in FIG. 1A corresponds to MD of the battery packaging material 10 of FIG. 1B. TD of the aluminum alloy foil 1 shown in FIG. 1A corresponds to TD of the battery packaging material 10 shown in FIG. 1B. Furthermore, for reference, FIG. 2 shows a photograph obtained by observing the glossy surface of a commercially available aluminum alloy foil (SUN FOIL from Toyo Aluminium K.K.) with a metallurgical microscope (100× magnification). In the photograph shown in FIG. 2, the black linear streaks are the rolling marks T, and it is seen that the rolling marks T extend in the rolling direction (RD). The rolling marks on the surface of the aluminum alloy foil can be identified using any apparatus other than a metallurgical microscope (such as an optical microscope) with which the surface can be observed by enlarging it about 50 to 100 times.

The aluminum alloy foil of the present invention contains aluminum crystals having a face-centered cubic structure. In the present invention, while focusing on the {111} plane of the face-centered cubic structure of the aluminum crystals, the crystal orientations of the aluminum crystals are analyzed using the EBSD method. As described below, preferably about 90% by mass or more of the aluminum alloy foil of the present invention is composed of aluminum; however, depending on the composition of other components, the aluminum alloy foil of the present invention may further contain aluminum crystals having a structure different from the face-centered cubic structure.

The inclusion of aluminum crystals having a face-centered cubic structure in the aluminum alloy foil can be easily guessed from the Kikuchi pattern obtained by analyzing the aluminum alloy foil, using the EBSD method. Furthermore, in order to accurately determine that the aluminum alloy foil contains aluminum crystals having a face-centered cubic structure, any of the following two methods is performed: In the case where the surface of the aluminum alloy foil is exposed, the structure can be analyzed using an X-ray diffractometer. In the case where the aluminum alloy foil is covered with resin or the like, and the surface of the aluminum alloy foil is not exposed, a section sample in which the aluminum alloy foil has a thickness of about 100 nm or less is prepared by polishing, or with a microtome, a focused ion beam, or a broad ion beam, for example. Next, for the section sample, a selected area diffraction pattern of a transmission electron microscope is obtained and analyzed to allow analysis of the structure.

Figure 3:
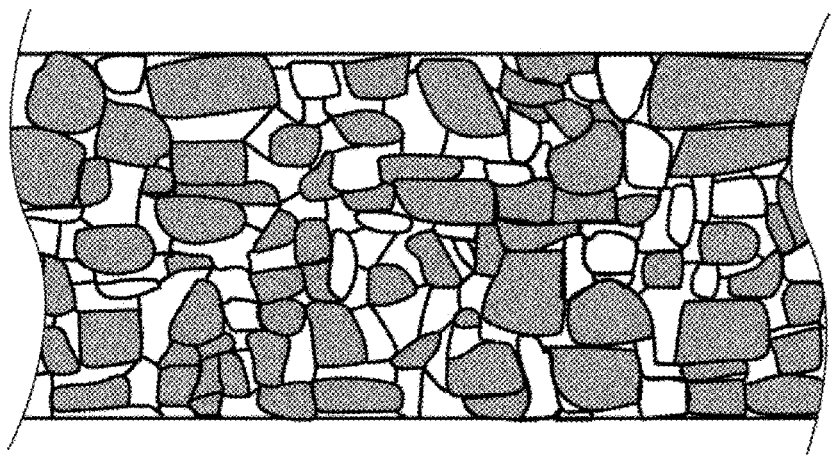
FIG. 3 is a schematic diagram of crystal planes of a face-centered cubic structure, in a cross section obtained by cutting the aluminum alloy foil according to the present invention in the vertical direction to the rolling direction of the aluminum alloy foil, which is the vertical direction to the surface of the aluminum alloy foil; the shaded regions indicate the {111} plane.

FIG. 3 is a schematic diagram of crystal planes of the face-centered cubic structure, in the cross section of the aluminum alloy foil according to the present invention. The shaded regions indicate the {111} plane.

From the viewpoint of even more effectively improving the moldability of the aluminum alloy foil of the present invention, the proportion of the total area of the {111} plane is preferably about 20% or more, more preferably about 30% or more, still more preferably about 40% or more, and particularly preferably about 50% or more, for example. In the aluminum alloy foil, the {111} plane is the slip plane during molding; therefore, when the proportion of the total area of the plane direction is higher, the crystals of the aluminum alloy are more likely to slip, which improves moldability. The proportion of the total area of the {111} plane means the total proportion of the area of the {111} plane, in the total area of the crystal planes of the face-centered cubic structure that are aligned parallel to the above-described cross section. However, for example, when a measurement sample is mounted on a sample table, an error may occur in the mounted position; therefore, "parallel to the cross section" may include an error of about 10°.

The upper limit of the proportion of the total area of the {111} plane is not particularly limited, and is about 100%, for example; in this case, however, the extensibility is limited to a specific direction, and the moldability may decrease. Thus, the upper limit is, for example, about 90% or about 80%, and the lower limit is, for example, about 25% or more, or about 29% or more. Examples of preferred ranges of the proportion of the total area of the {111} plane include from about 10 to 90%, from about 10 to 80%, from about 20 to 90%, from about 20 to 80%, from about 25 to 90%, from about 25 to 80%, from about 29 to 90%, from about 29 to 80%, from about 30 to 90%, from about 30 to 80%, from about 40 to 90%, from about 40 to 80%, from about 50 to 90%, and from about 50 to 80%.

Furthermore, in the present invention, from the viewpoint of even more effectively improving the moldability of the aluminum alloy foil, the proportion (%) of the total area of the {111} plane preferably satisfies the following equation:

proportion (%) of the total area of the {111} plane$\geq -1.1X+66$, where X=thickness (μm) of the aluminum alloy foil.

Specifically, when the thickness of the aluminum alloy foil is small, the proportion of the total area of the {111} plane is preferably large, and, as the thickness of the aluminum alloy foil decreases, the influence of the proportion of the total area of the {111} plane upon moldability increases; therefore, when the equation shown above is satisfied, even better moldability can be achieved.

Furthermore, from the same viewpoint as above, although the upper limit of the proportion of the total area of the {111} plane is not particularly limited, for example, it preferably satisfies the following equation:

$-1.1X+98 \geq$ proportion (%) of the total area of the {111} plane, where X=thickness (μm) of the aluminum alloy foil.

Furthermore, the present invention is characterized in that, with respect to a cross section obtained by cutting the aluminum alloy foil in the vertical direction to the rolling direction (RD) of the aluminum alloy foil, which is the vertical direction (ND) to the surface of the aluminum alloy foil, the number average grain diameter R of crystals in the face-centered cubic structure, obtained by performing crystal analysis using the EBSD method, satisfies the equation shown below. The upper limit of the R value is about 4.5, about 4.0, or about 3.5, for example, and the lower limit of the R value is about 1.0, about 2.0, or about 3.0, for example.

Number average grain diameter $R \leq 0.056X+2.0$, where X=thickness (μm) of the aluminum alloy foil.

The aluminum alloy foil of the present invention has the above-described proportion of the total area of the {111} plane, and has the above-described specific relationship between the number average grain diameter and the thickness of the aluminum alloy foil, thereby exhibiting excellent moldability. In previous aluminum alloy foils, the relationship between the thickness of the aluminum alloy foil and the number average grain diameter has not been considered; thus, there is a disadvantage in that, for example, when the thickness of the aluminum alloy foil is changed, the moldability decreases. In contrast, because the aluminum alloy foil of the present invention has the above-described specific relationship between the number average grain diameter and the thickness of the aluminum alloy foil, it can exhibit excellent moldability even when the thickness of the aluminum alloy foil is changed; in particular, the aluminum alloy foil of the present invention can exhibit excellent moldability even when the thickness of the aluminum alloy foil is small as described below.

Furthermore, the lower limit of the number average grain diameter R of crystals in the face-centered cubic structure is not particularly limited, and is preferably about 1 km. Moreover, the lower limit preferably satisfies the equation shown below. When the lower limit is about 1 m, or satisfies the equation shown below, the yield strength of the aluminum alloy foil does not become excessively high, which can prevent the aluminum alloy foil from becoming hard, and prevent the moldability from decreasing.

$0.056X+0.4 \leq$ number average grain diameter $R$, where X=thickness (μm) of the aluminum alloy foil.

From the viewpoint of even more effectively improving the moldability of the aluminum alloy foil of the present invention, the standard deviation of the above-described grain diameter preferably satisfies the following equation:

standard deviation St of the grain diameter$\leq 0.09X+0.5$, where X=thickness (μm) of the aluminum alloy foil.

Specifically, when the standard deviation of the grain diameter is small, the variation in the grain diameter of crystal grains in the aluminum alloy foil is small, and the aluminum alloy foil is smoothly deformed during molding. Moreover, as the thickness of the aluminum alloy foil decreases, the influence of this standard deviation upon moldability increases; therefore, when the equation shown above is satisfied, even better moldability can be achieved.

Furthermore, from the same viewpoint as above, the lower limit of the standard deviation of the grain diameter is not particularly limited, and is preferably zero.

Figure 12:
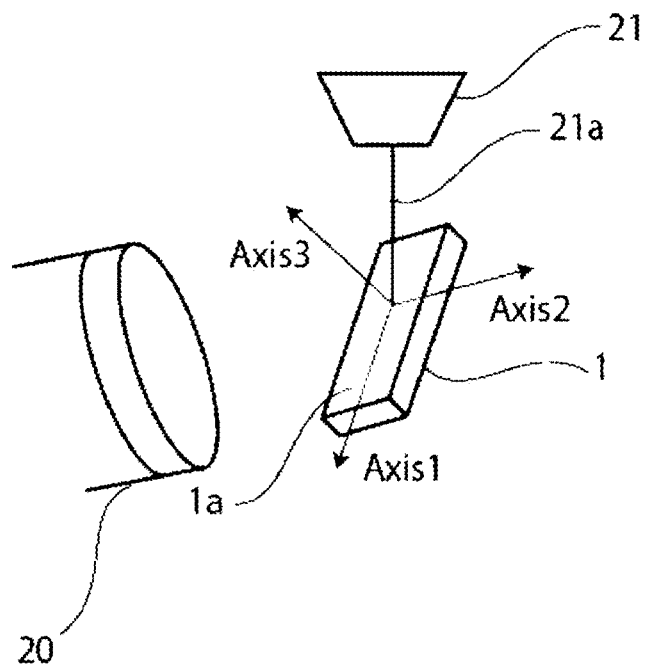
FIG. 12 is a schematic diagram for explaining a method of performing crystal analysis using the EBSD method, for a cross section of an aluminum alloy foil.
Figure 13:
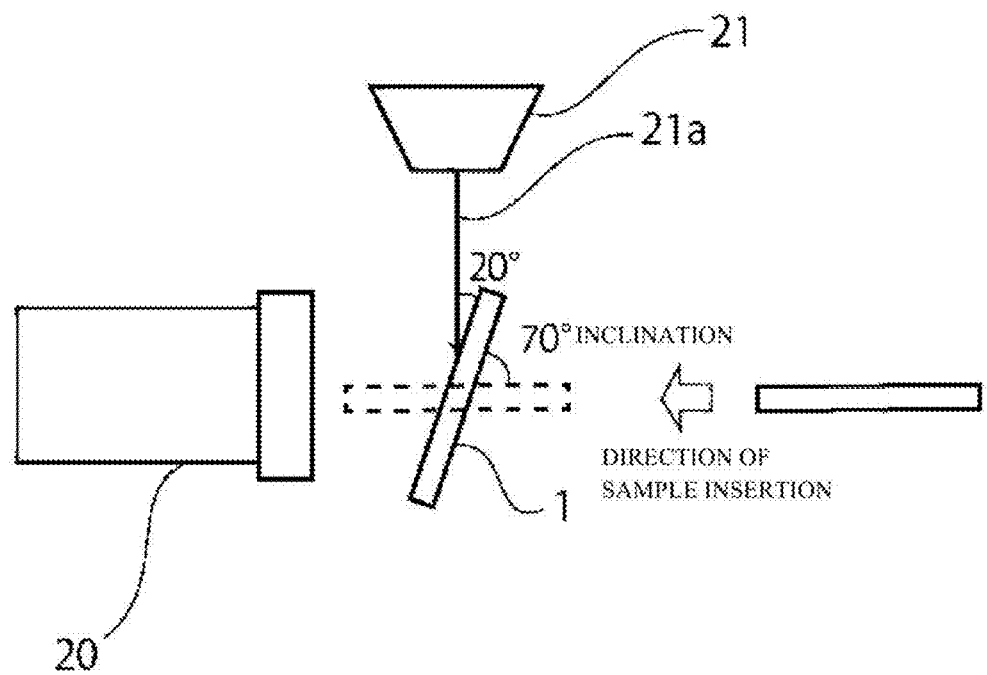
FIG. 13 is a (two-dimensional) schematic diagram for explaining the method of performing crystal analysis using the EBSD method, for a cross section of an aluminum alloy foil.

In the present invention, the proportion of the total area of the {111} plane, the number average grain diameter, and the standard deviation of the grain diameter of the aluminum alloy foil can be measured by performing crystal analysis using the EBSD method, for a cross section obtained by cutting the aluminum alloy foil in the vertical direction to the rolling direction of the aluminum alloy foil, which is the vertical direction to the surface of the aluminum alloy foil. FIG. 12 illustrates a schematic diagram for explaining a method of performing crystal analysis using the EBSD method, for the cross section of the aluminum alloy foil. In FIG. 12, a sample of the aluminum alloy foil 1 is placed such that Axis1 corresponds to ND, Axis2 corresponds to TD, and Axis3 corresponds to RD. An electron beam 21a is directed toward a cross section 1a of the aluminum alloy foil 1 from an objective lens 21 of a SEM, and crystal analysis is performed in the Axis3 direction by an EBSD detector 20. Axis1, Axis2, and Axis3 form an angle of 90° with one another, and the sample of the aluminum alloy foil 1 is inclined 70° with respect to the Axis1 direction. Specifically, in a common SEM, a sample is conveyed horizontally, and an electron beam is directed downward straight from the above; whereas in the present invention, as shown in FIG. 13, the sample of the aluminum alloy foil 1 is inclined 70° with respect to the Axis1 direction. Specific measurement conditions are as described below.

The number average grain diameter is the diameter when the area calculated in accordance with [(measurement region−region having a CI value of 0.1 or less)/number of crystals] is assumed to be a circle; it is the number average grain diameter of crystals contained in a measurement region of about 10,000 μm$^2$ or more, which is formed by connecting a plurality of images obtained by crystal analysis using the EBSD method. The CI value is as described below.

The standard deviation of the grain diameter is the value calculated based on the distribution of the grain diameter of crystals (diameter when the crystal area is assumed to be a circle) contained in a measurement region of about 10,000 μm$^2$ or more, which is formed by removing a region having a CI value of 0.1 or less, and then connecting a plurality of images obtained by crystal analysis using the EBSD method.

(Measurement Apparatus)

An apparatus in which an EBSD detector (from TSL Solutions K.K.) has been incorporated into a Schottky field emission scanning electron microscope is used.

(Pre-Treatment)

As a pre-treatment, the aluminum alloy foil is cut in the vertical direction to the rolling direction (RD) to obtain a cross section. The rolling direction of the aluminum alloy foil is a direction in which linear rolling marks extend when the glossy surface of the aluminum alloy foil is observed with a metallurgical microscope. Specific procedures are as follows: Initially, the aluminum alloy foil for use as a sample is cut into 5 mm (vertical direction to the rolling direction)× 10 mm (rolling direction) with a trimming razor, and then embedded in resin. Next, using the trimming razor, the aluminum alloy foil is cut, together with the resin, in the vertical direction to the rolling direction of the aluminum alloy foil, which is the vertical direction to the surface of the aluminum alloy foil, to expose a cross section of the aluminum alloy foil. Next, the obtained cross section is trimmed using a microtome. This trimming involves cutting, with the microtome, the cross section together with the embedding resin through to about 1 mm in the vertical direction to the cross section, in order to reduce mechanical strain of the cut surface. Next, using an ion milling apparatus, a broad argon beam is vertically directed to the cross section, to prepare a measurement cross section. This operation is to precisely expose the cross section of the aluminum alloy foil to minimize the mechanical damage into the crystal structure occurred in the previous step. In the present invention, "vertical direction" when cutting the aluminum alloy foil may include an error of about 10°, because this is performed while observing under a stereomicroscope. Specifically, the vertical direction to the rolling direction includes a tolerance of 80 to 100° to the rolling direction, and the vertical direction to the surface includes a tolerance of 80 to 100° to the surface.

(SEM Conditions)

The conditions for the scanning electron microscope (SEM) used in the EBSD method are as follows:

Observation magnification: 2,000 times (the observation magnification standard during photographing is Polaroid 545)

Acceleration voltage: 15 kV

Working distance: 15 mm

Sample inclination angle: 70°

(EBSD Conditions)

The conditions for the crystal analysis using the EBSD method are as follows:

Step size: 200 nm

Analysis conditions:

The crystal orientation analysis software OIM (Ver 7.3) from TSL Solutions K.K. is used to perform the following analysis.

A plurality of images are connected to form a measurement region of about 10,000 μm$^2$ or more. The upper limit of the measurement region is about 30,000 μm$^2$ or less, for example. At this time, the region from the center to both ends of the aluminum alloy foil in the thickness direction is defined as the measurement region. Any portion of the cross section to which the resin is attached, or any portion where the acid resistance film is present, is excluded from the measurement region.

After the images are connected, a pole figure is observed. When the center of the pole figure is displaced 10° or more, the crystal data is rotated to adjust the symmetry. A pole figure to be used here for reference is measured from the sample surface by XRD. When a pole figure is to be obtained from the surface by EBSD, the sample surface is subjected to mechanical polishing, flat milling, electropolishing, or the like, in order to eliminate the mechanical influence of the crystal structure of the sample surface, and then wide-area measurement is performed. Then, the pole figure obtained in the surface direction is rotated 90° to be identical to be a pole figure obtained in the same orientation as that of the pole figure obtained from the cross section of the sample of interest. This pole figure is used for reference.

Data whose CI value (Confidence Index: CI value) defined by the crystal orientation analysis software OIM (Ver 7.3) from TSL Solutions K.K. is 0.1 or less is excluded, and then the analysis is performed. This allows exclusion of data based on the resin used for the pre-treatment that is present on the front and back surfaces of the sample, grain boundaries present in the cross section, or the amorphous state.

In the calculation of the proportion of the total area of the {111} plane, the analysis is performed with an acceptable angle of 15°.

When the above-described proportion of the total area of the {111} plane, number average grain diameter, and standard deviation of the grain diameter of the aluminum alloy foil are to be measured for a battery obtained using the battery packaging material of the present invention, the battery packaging material can be cut from a flat portion of the battery, and these items can be measured.

While the thickness of the aluminum alloy foil of the present invention is not particularly limited, it is preferably about 3 to 100 μm, for example, from the viewpoint of suitably using the aluminum alloy foil for a battery packaging material. As described above, the aluminum alloy foil of the present invention has the above-described proportion of the total area of the {111} plane, and has the above-described specific relationship between the number average grain diameter and the thickness of the aluminum alloy foil, thereby exhibiting excellent moldability. Thus, the aluminum alloy foil of the present invention can exhibit excellent moldability when it has a thickness of, for example, about 100 μm or less, or about 80 μm or less, or even about 40 μm or less. From the viewpoint of suitably using the aluminum alloy foil of the present invention for a battery packaging material to be molded, the thickness of the aluminum alloy foil is preferably about 3 μm or more, about 5 μm or more, about 10 µm or more, about 15 µm or more, or about 20 µm or more, for example. Furthermore, the range of the thickness of the aluminum alloy foil is preferably from about 3 to 100 µm, from about 5 to 100 µm, from about 10 to 100 µm, from about 15 to 100 µm, from about 20 to 100 µm, from about 3 to 80 µm, from about 5 to 80 µm, from about 10 to 80 µm, from about 15 to 80 µm, from about 20 to 80 µm, from about 3 to 40 µm, from about 5 to 40 µm, from about 15 to 40 µm, or from about 20 to 40 µm, for example. Because the aluminum alloy foil of the present invention exhibits excellent moldability, it can be suitably used for a battery packaging material even when it has a very small thickness, i.e., about 10 to 40 µm, or even about 10 to 20 µm.

From the viewpoint of improving the moldability, the aluminum alloy foil of the present invention preferably contains iron. The content of iron is preferably about 0.5 to 2.0% by mass, and more preferably about 1.2 to 1.8% by mass, for example. The composition of the aluminum alloy constituting an aluminum alloy foil layer can be identified by elemental analysis. Furthermore, the composition of the aluminum alloy can be quantified by ICP emission spectrochemical analysis (Inductively Coupled Plasma Atomic Emission Spectroscopy: ICP-AES).

While the aluminum alloy constituting the aluminum alloy foil is not particularly limited, the content of aluminum in the aluminum alloy is preferably 90% by mass or more, from the viewpoint of exhibiting excellent moldability. Specific examples of preferred aluminum alloys include soft aluminum alloys having the compositions defined in JIS H4160: 1994 A8021H-O, JIS H4160: 1994 A8079H-O, JIS H4000: 2014 A8021P-O, JIS H4000: 2014 A8079P-O, and the like.

The aluminum alloy foil having the above-described features can be produced using a known production method, and it can be produced by, for example, adjusting, as appropriate, the composition, the rolling conditions, the thickness, and the like of the aluminum alloy. As the composition of the aluminum alloy, for example, the presence or absence of the metal other than aluminum to be contained in the aluminum alloy (for example, at least one from iron, copper, nickel, silicon, manganese, magnesium, chromium, zinc, titanium, and the like) and the amount of the metal are adjusted. The above-described composition is preferred as the composition of the aluminum alloy.

As the rolling conditions, conditions such as rolling reduction ratio, heating temperature, and heating time are adjusted. Examples of the method include a method including the steps of subjecting aluminum metal or an aluminum alloy ingot to a homogenization treatment at about 500 to 600° C. for about 1 to 2 hours; hot rolling; cold rolling; intermediate annealing in which the above-described material is held at about 300 to 450° C. for about 1 to 10 hours; cold rolling in which rolling is performed at a rolling reduction ratio of 80% or more, preferably 90% or more, from after the intermediate annealing to final rolling; and final annealing in which the above-described material is held at about 250 to 400° C. for about 30 to 100 hours.

Furthermore, preferably, at least one surface, preferably both surfaces, of the aluminum alloy foil 1 is/are subjected to a chemical conversion treatment, in order to stabilize the adhesion, and prevent dissolution or corrosion, for example. As used herein, the chemical conversion treatment refers to a treatment for forming an acid resistance film on a surface of the aluminum alloy foil. When the acid resistance film is formed on the surface of the aluminum alloy foil, the aluminum alloy foil includes the acid resistance film. Examples of the chemical conversion treatment include a chromate treatment using a chromium compound, such as chromium nitrate, chromium fluoride, chromium sulfate, chromium acetate, chromium oxalate, chromium biphosphate, acetylacetate chromate, chromium chloride, or chromium potassium sulfate; a phosphoric acid treatment using a phosphoric acid compound, such as sodium phosphate, potassium phosphate, ammonium phosphate, or polyphosphoric acid; and a chemical conversion treatment using an aminated phenol polymer having any of the repeating units represented by the following general formulae (1) to (4). Among the chromium compounds, a chromic acid compound is preferred. The aminated phenol polymer may contain the repeating units represented by the following general formulae (1) to (4) alone or in any combinations of two or more.

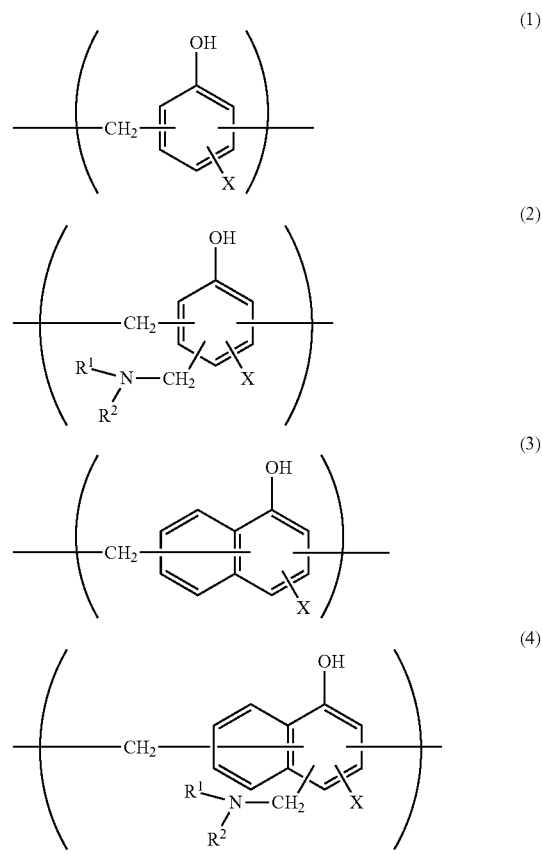

In the general formulae (1) to (4), X represents a hydrogen atom, a hydroxy group, an alkyl group, a hydroxyalkyl group, an allyl group, or a benzyl group. $R^1$ and $R^2$ are the same or different, and each represent a hydroxy group, an alkyl group, or a hydroxyalkyl group. In the general formulae (1) to (4), examples of alkyl groups represented by X, $R^1$, and $R^2$ include linear or branched alkyl groups having 1 to 4 carbon atoms, such as a methyl group, an ethyl group, a n-propyl group, an isopropyl group, a n-butyl group, an isobutyl group, and a tert-butyl group. Examples of hydroxyalkyl groups represented by X, $R^1$, and $R^2$ include linear or branched alkyl groups having 1 to 4 carbon atoms, which are substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group, and a 4-hydroxybutyl group. In the general formulae (1) to (4), the alkyl groups and the hydroxyalkyl groups represented by X, $R^1$ and $R^2$ may be the same or different. In the general formulae (1) to (4), X is preferably a hydrogen atom, a hydroxy group, or a hydroxyalkyl group. The number average molecular weight of the aminated phenol polymer having any of the repeating units represented by the general formulae (1) to (4) is preferably about 500 to 1,000,000, and more preferably about 1,000 to 20,000, for example.

Examples of the chemical conversion treatment method for imparting corrosion resistance to the aluminum alloy foil 1 include a method in which the aluminum alloy foil 1 is coated with a dispersion of fine particles of barium sulfate or a metal oxide such as aluminum oxide, titanium oxide, cerium oxide, or tin oxide in phosphoric acid, and subjected to a baking treatment at about 150° C. or higher to form an anticorrosive-treated layer on a surface of the aluminum alloy foil 1. A resin layer obtained by crosslinking a cationic polymer with a crosslinking agent may also be formed on the anticorrosive-treated layer. Examples of the cationic polymer herein include polyethyleneimine, ion polymer complexes composed of polymers containing polyethyleneimine and carboxylic acids, primary amine-grafted acrylic resins obtained by grafting primary amines to an acrylic backbone, polyallylamine or derivatives thereof, and aminophenol. These cationic polymers may be used alone or in combinations of two or more. Examples of the crosslinking agent include silane coupling agents and compounds having at least one functional group selected from the group consisting of an isocyanate group, a glycidyl group, a carboxyl group, and an oxazoline group. These crosslinking agents may be used alone or in combinations of two or more.

One example of a specific method for providing an acid resistance film is as follows: Initially, at least the inner layer-side surface of the aluminum alloy foil is subjected to a degreasing treatment, using a well-known treatment method such as an alkali immersion method, an electrolytic cleaning method, an acid cleaning method, an electrolytic acid cleaning method, or an acid activation method. Then, a treatment solution (aqueous solution) containing, as a main component, a phosphoric acid metal salt, such as chromium phosphate, titanium phosphate, zirconium phosphate, or zinc phosphate, or a mixture of these metal salts, or a treatment solution (aqueous solution) containing, as a main component, a phosphoric acid non-metal salt or a mixture of such non-metal salts, or a treatment solution (aqueous solution) containing a mixture of any of the above and an aqueous synthetic resin, such as an acrylic-based resin, a phenol-based resin, or a urethane-based resin, is applied to the degreasing-treated surface, using a well-known coating method such as a roll coating method, a gravure printing method, or an immersion method. As a result, an acid resistance film can be formed. For example, when the treatment is performed using a chromium phosphate-based treatment solution, an acid resistance film composed of chromium phosphate, aluminum phosphate, aluminum oxide, aluminum hydroxide, aluminum fluoride, and the like is formed. When the treatment is performed using a zinc phosphate-based treatment solution, an acid resistance film composed of zinc phosphate hydrate, aluminum phosphate, aluminum oxide, aluminum hydroxide, aluminum fluoride, and the like is formed.

Another example of a specific method for providing an acid resistance film is as follows: Initially, at least the inner layer-side surface of the aluminum alloy foil is subjected to a degreasing treatment, using a well-known treatment method such as an alkali immersion method, an electrolytic cleaning method, an acid cleaning method, an electrolytic acid cleaning method, or an acid activation method. Then, the degreasing-treated surface is subjected to a well-known anodization treatment. As a result, an acid resistance film can be formed.

Other examples of the acid resistance film include phosphate-based films and chromate-based films. Examples of phosphates include zinc phosphate, iron phosphate, manganese phosphate, calcium phosphate, and chromium phosphate; and examples of chromates include chromium chromate.

Other examples of the acid resistance film include an acid resistance film composed of a phosphorus compound (such as a phosphate), a chromium compound (such as a chromate), a fluorine compound (such as a fluoride), a triazine-thiol compound, or the like. When this acid resistance film is formed, it prevents delamination between aluminum and the base material layer during embossing molding, and prevents dissolution or corrosion of the aluminum surface, particularly dissolution or corrosion of aluminum oxide present on the surface of aluminum, due to hydrogen fluoride produced by the reaction between the electrolyte and moisture. The acid resistance film also improves the adhesion (wettability) of the aluminum surface, and exhibits the effect of preventing delamination between the base material layer and aluminum during heat-sealing, or the effect of preventing delamination between the base material layer and aluminum during press molding in the case of embossed-type products. Among the materials that form the acid resistance film, an aqueous solution composed of three components, i.e., a phenol resin, a chromium(III) fluoride compound, and phosphoric acid, is preferably applied to the aluminum surface, and subjected to a drying and baking treatment.

The acid resistance film may also include a layer containing cerium oxide, phosphoric acid or a phosphate, an anionic polymer, and a crosslinking agent that crosslinks the anionic polymer, wherein the phosphoric acid or phosphate may be blended in an amount of about 1 to 100 parts by mass, per 100 parts by mass of the cerium oxide. The acid resistance film preferably has a multilayer structure that further includes a layer containing a cationic polymer and a crosslinking agent that crosslinks the cationic polymer.

The anionic polymer is preferably a copolymer that contains, as a main component, poly(meth)acrylic acid or a salt thereof, or (meth)acrylic acid or a salt thereof. The crosslinking agent is preferably at least one selected from the group consisting of silane coupling agents and compounds having, as a functional group, any of an isocyanate group, a glycidyl group, a carboxyl group, and an oxazoline group.

The phosphoric acid or phosphate is preferably condensed phosphoric acid or a condensed phosphate.

These chemical conversion treatments may be performed alone or in combinations of two or more. Furthermore, these chemical conversion treatments may be performed using one compound alone, or using two or more compounds in combination. Preferred among these chemical conversion treatments is, for example, a chromate treatment, or a chemical conversion treatment using a chromium compound, a phosphoric acid compound, and the aminated phenol polymer in combination.

Specific examples of the acid resistance film include an acid resistance film containing at least one of a phosphate, a chromate, a fluoride, and a triazine-thiol. An acid resistance film containing a cerium compound is also preferred. The cerium compound is preferably cerium oxide.

Specific examples of the acid resistance film also include phosphate-based films, chromate-based films, fluoride-based films, and triazine-thiol compound-based films. These acid resistance films may be used alone or in combinations of two or more. The acid resistance film may also be an acid resistance film that is formed by subjecting the chemical conversion-treated surface of the aluminum alloy foil to a degreasing treatment, and then treating the degreasing-treated surface with a treatment solution containing a mixture of a phosphoric acid metal salt and an aqueous synthetic resin or a treatment solution containing a mixture of a phosphoric acid non-metal salt and an aqueous synthetic resin.

The analysis of the composition of the acid resistance film can be performed by, for example, physically removing a heat-sealable resin layer, an adhesive agent layer, and the like laminated on the aluminum alloy foil of a battery packaging material, and then using time-of-flight secondary ion mass spectrometry. As a result of the analysis of the composition of the acid resistance film using time-of-flight secondary ion mass spectrometry, a peak derived from at least one of $Ce^+$ and $Cr^+$, for example, is detected.

The aluminum alloy foil preferably includes, on a surface thereof, an acid resistance film containing at least one element selected from the group consisting of phosphorus, chromium, and cerium. The inclusion of at least one element selected from the group consisting of phosphorus, chromium, and cerium in the acid resistance film on the surface of the aluminum alloy foil of the battery packaging material can be confirmed using X-ray photoelectron spectroscopy. Specifically, initially, in the battery packaging material, the heat-sealable resin layer, the adhesive agent layer, and the like laminated on the aluminum alloy foil are physically removed. Next, the aluminum alloy foil is placed in an electric furnace, and allowed to stand at about 300° C. for about 30 minutes to eliminate organic components present on the surface of the aluminum alloy foil. Then, the inclusion of these elements is confirmed using X-ray photoelectron spectroscopy on the surface of the aluminum alloy foil.

The amount of the acid resistance film to be formed on the surface of the aluminum alloy foil 1 in the chemical conversion treatment is not particularly limited; for example, when the above-described chromate treatment is performed, it is preferred that the chromium compound be contained in an amount of about 0.5 to 50 mg, preferably about 1.0 to 40 mg, calculated as chromium, the phosphorus compound be contained in an amount of about 0.5 to 50 mg, preferably about 1.0 to 40 mg, calculated as phosphorus, and the aminated phenol polymer be contained in an amount of about 1 to 200 mg, preferably about 5.0 to 150 mg, per $m^2$ of the surface of the aluminum alloy foil 1.

While the thickness of the acid resistance film is not particularly limited, it is preferably about 1 nm to 10 μm, more preferably about 1 to 100 nm, and still more preferably about 1 to 50 nm, for example, from the viewpoint of the cohesive force of the film, and the adhesion force between the acid resistance film and the aluminum alloy foil or the heat-sealable resin layer. The thickness of the acid resistance film can be measured by observation with a transmission electron microscope, or a combination thereof with energy dispersive X-ray spectroscopy or electron energy loss spectroscopy.

The chemical conversion treatment is performed by applying the compound-containing solution to be used for forming the acid resistance film to a surface of the aluminum alloy foil, using a bar coating method, a roll coating method, a gravure coating method, an immersion method, or the like, followed by heating such that the temperature of the aluminum alloy foil increases to about 70 to 200° C. Furthermore, before the aluminum alloy foil is subjected to the chemical conversion treatment, the aluminum alloy foil may be subjected to a degreasing treatment using an alkali immersion method, an electrolytic cleaning method, an acid cleaning method, an electrolytic acid cleaning method, or the like. The degreasing treatment allows the chemical conversion treatment of the surface of the aluminum alloy foil to be more efficiently performed.

As described below, the aluminum alloy foil of the present invention can be suitably used for the battery packaging material of the present invention. Specifically, the aluminum alloy foil of the present invention can be suitably used as an aluminum alloy foil in a battery packaging material including a laminate including at least a base material layer, the aluminum alloy foil, and a heat-sealable resin layer in this order.

2. Battery Packaging Material

Laminated Structure

Figure 4:
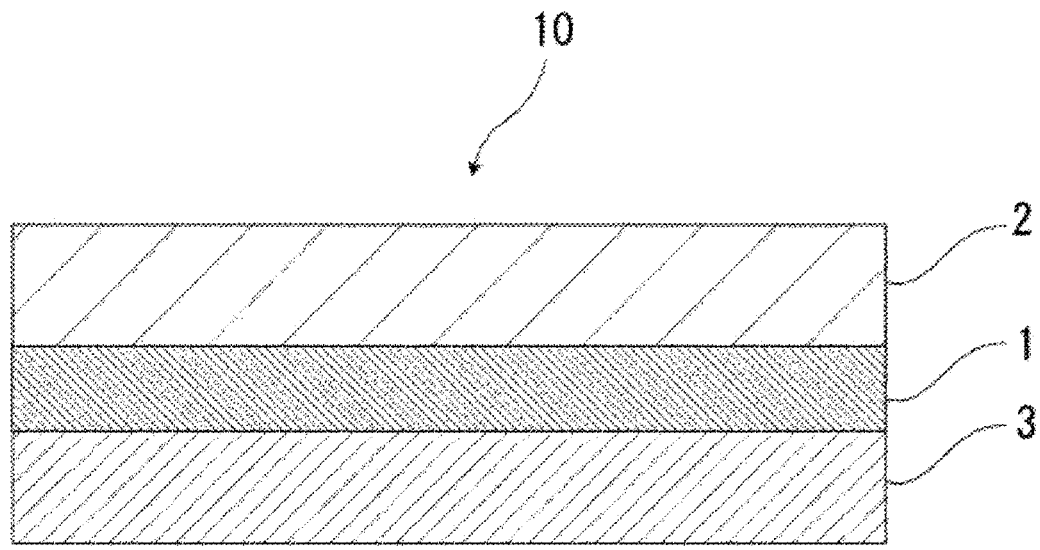
FIG. 4 is a schematic cross-sectional view of one exemplary battery packaging material according to the present invention.

As shown in FIG. 4, a battery packaging material of the present invention includes a laminate having at least the base material layer 2, the aluminum alloy foil 1, and the heat-sealable resin layer 3 in this order. In the battery packaging material of the present invention, the base material layer 2 is an outermost layer, and the heat-sealable resin layer 3 is an innermost layer. That is, during the assembly of a battery, the heat-sealable resin layer 3 positioned on the periphery of a battery element is heat-welded with itself to hermetically seal the battery element, so that the battery element is encapsulated.

Figure 5:
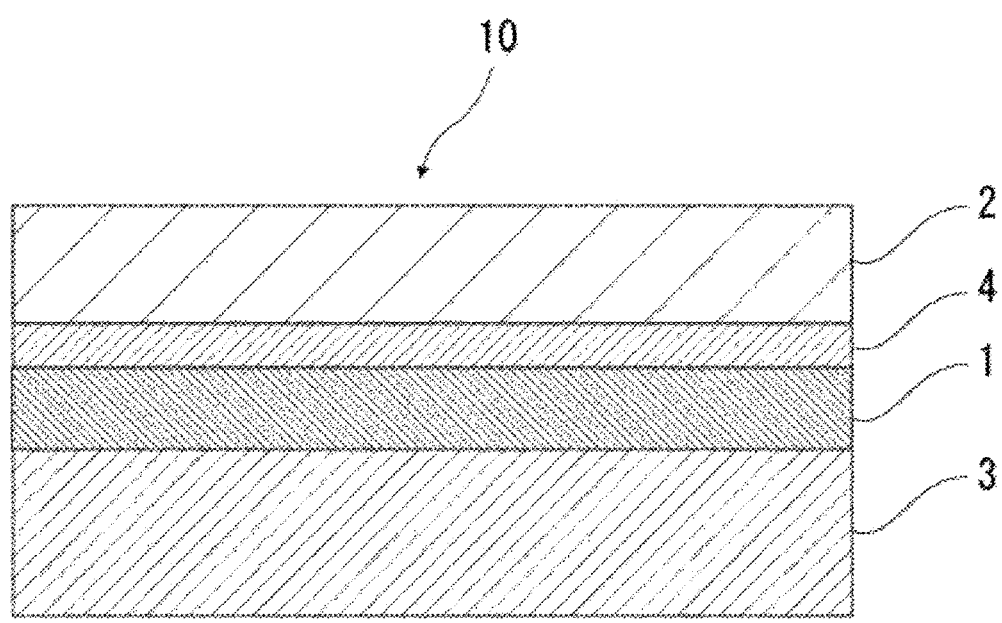
FIG. 5 is a schematic cross-sectional view of one exemplary battery packaging material according to the present invention.
Figure 6:
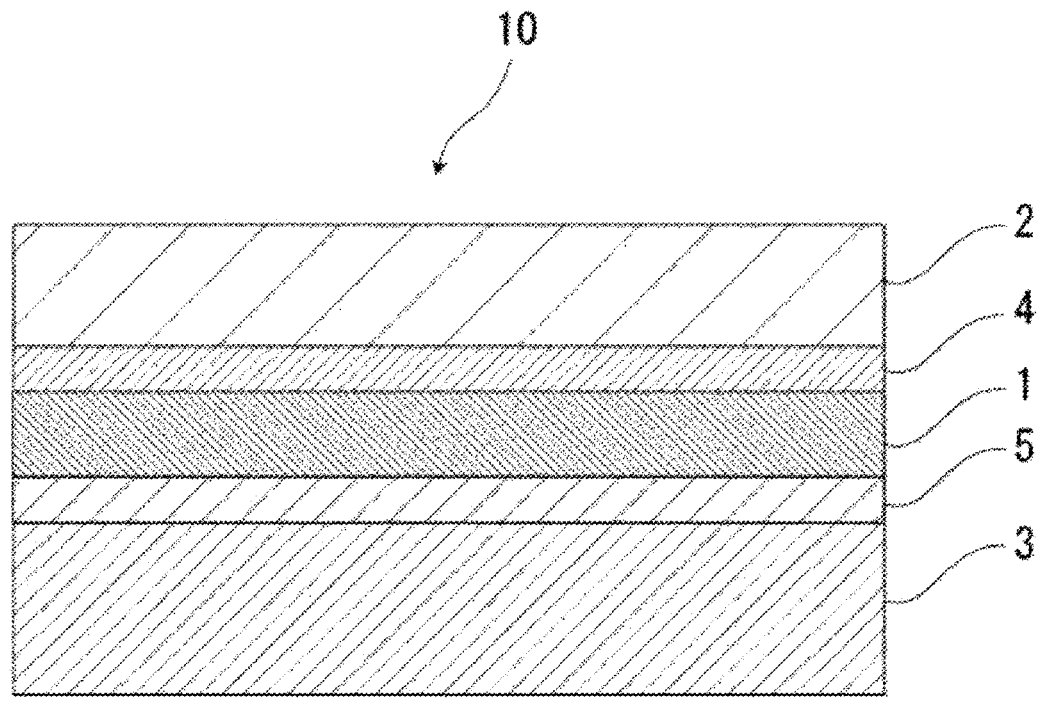
FIG. 6 is a schematic cross-sectional view of one exemplary battery packaging material according to the present invention.
Figure 7:
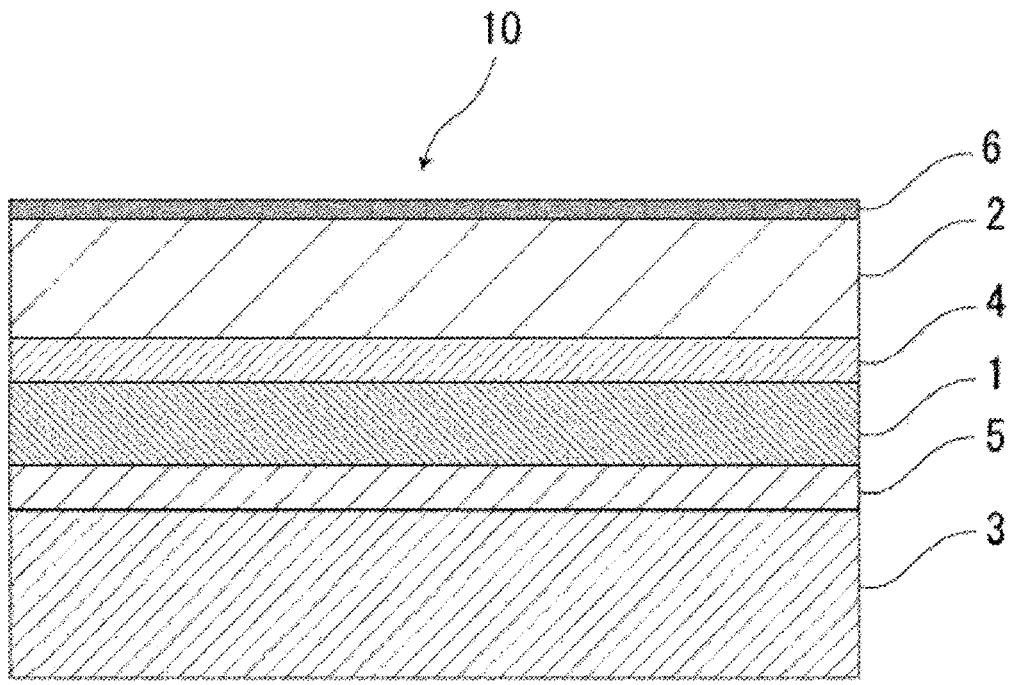
FIG. 7 is a schematic cross-sectional view of one exemplary battery packaging material according to the present invention.

As shown in FIG. 5, the battery packaging material of the present invention may optionally include an adhesive agent layer 4 between the base material layer 2 and the aluminum alloy foil 1, in order to improve the adhesion between these layers. Moreover, as shown in FIG. 6, the battery packaging material of the present invention may also optionally include an adhesive layer 5 between the aluminum alloy foil 1 and the heat-sealable resin layer 3, in order to improve the adhesion between these layers. Furthermore, as shown in FIG. 7, a surface coating layer 6 or the like may be optionally provided on the outer side (opposite to the heat-sealable resin layer 3) of the base material layer 2.

While the thickness of the laminate constituting the battery packaging material of the present invention is not particularly limited, it is preferably about 160 m or less, more preferably about 35 to 155 m, and still more preferably about 45 to 120 m, for example, from the viewpoint of exhibiting high moldability, while reducing the thickness of the laminate as much as possible. Even when the thickness of the laminate constituting the battery packaging material of the present invention is small, i.e., about 160 m or less, for example, excellent moldability can be achieved in accordance with the present invention. Thus, the battery packaging material of the present invention can contribute to improvement in the energy density of a battery.

Layers That Form the Battery Packaging Material

[Base Material Layer 2]

In the battery packaging material of the present invention, the base material layer 2 is positioned as an outermost layer. The material that forms the base material layer 2 is not particularly limited as long as it has insulation properties. Examples of the material that forms the base material layer 2 include resin films of, for example, polyester resins, polyamide resins, epoxy resins, acrylic resins, fluororesins, polyurethane resins, silicone resins, phenol resins, and mixtures or copolymers thereof. Among the above, for example, polyester resins and polyamide resins are preferred, and biaxially stretched polyester resins and biaxially stretched polyamide resins are more preferred. Specific examples of polyester resins include polyethylene terephthalate, polybutylene terephthalate, polyethylene naphthalate, polybutylene naphthalate, copolyesters, and polycarbonates. Specific examples of polyamide resins include nylon 6, nylon 66, copolymers of nylon 6 and nylon 66, nylon 6,10, and polyamide MXD6 (polymethaxylylene adipamide).

While the base material layer 2 may be formed of a single layer of a resin film, it may be formed of two or more layers of resin films, in order to improve the pinhole resistance or insulation properties. Specific examples include a multilayer structure in which a polyester film and a nylon film are laminated, a multilayer structure in which a plurality of layers of nylon films are laminated, and a multilayer structure in which a plurality of layers of polyester films are laminated. When the base material layer 2 has a multilayer structure, it is preferably composed of a laminate of a biaxially stretched nylon film and a biaxially stretched polyester film, a laminate of a plurality of layers of biaxially stretched nylon films, or a laminate of a plurality of layers of biaxially stretched polyester films. For example, when the base material layer 2 is formed of two layers of resin films, it preferably has a structure in which a polyester resin and a polyester resin are laminated, a structure in which a polyamide resin and a polyamide resin are laminated, or a structure in which a polyester resin and a polyamide resin are laminated, and more preferably has a structure in which polyethylene terephthalate and polyethylene terephthalate are laminated, a structure in which nylon and nylon are laminated, or a structure in which polyethylene terephthalate and nylon are laminated. Because a polyester resin is unlikely to change in color when, for example, the electrolytic solution is attached to the surface, the laminated structure of the base material layer 2 is preferably formed such that the polyester resin is positioned as an outermost layer. When the base material layer 2 has a multilayer structure, the thickness of each of the layers is preferably about 2 to m, for example.

When the base material layer 2 is formed of multiple layers of resin films, the two or more resin films may be laminated with an adhesive component such as an adhesive or an adhesive resin sandwiched therebetween. The type, the amount, and the like of the adhesive component to be used are the same as described below for the adhesive agent layer 4. The method of laminating the two or more layers of resin films is not particularly limited, and a known method can be adopted, such as, for example, a dry lamination method or a sandwich lamination method, preferably the dry lamination method. When the layers are laminated using the dry lamination method, a urethane-based adhesive is preferably used as an adhesive layer. In this case, the thickness of the adhesive layer is about 2 to 5 m, for example.

In the present invention, from the viewpoint of improving the moldability of the battery packaging material, a lubricant is preferably present on the surface of the base material layer 2. While the lubricant is not particularly limited, it is preferably an amide-based lubricant, for example. Specific examples of the amide-based lubricant include saturated fatty acid amides, unsaturated fatty acid amides, substituted amides, methylol amides, saturated fatty acid bis-amides, and unsaturated fatty acid bis-amides. Specific examples of saturated fatty acid amides include lauramide, palmitamide, stearamide, behenamide, and hydroxystearamide. Specific examples of unsaturated fatty acid amides include oleamide and erucamide. Specific examples of substituted amides include N-oleyl palmitamide, N-stearyl stearamide, N-stearyl oleamide, N-oleyl stearamide, and N-stearyl erucamide. Specific examples of methylol amides include methylol stearamide. Specific examples of saturated fatty acid bis-amides include methylene-bis-stearamide, ethylene-bis-capramide, ethylene-bis-lauramide, ethyl ene-bis-stearamide, ethylene-bis-hydroxy stearamide, ethylene-bis-behenamide, hexamethylene-bis-stearamide, hexamethylene-bis-behenamide, hexamethylene hydroxystearamide, N,N'-distearyl adipamide, and N,N'-distearyl sebacamide. Specific examples of unsaturated fatty acid bis-amides include ethylene-bis-oleamide, ethylene-bis-erucamide, hexamethylene-bis-oleamide, N,N'-dioleyl adipamide, and N,N'-dioleyl sebacamide. Specific examples of fatty acid ester amides include stearamide ethyl stearate. Specific examples of aromatic bis-amides include m-xylylene-bis-stearamide, m-xylylene-bis-hydroxystearamide, and N,N'-distearyl isophthalamide. These lubricants may be used alone or in combinations of two or more.

When a lubricant is present on the surface of the base material layer 2, the amount of the lubricant present is not particularly limited, but is preferably about 3 mg/m$^2$ or more, more preferably about 4 to 15 mg/m$^2$, and still more preferably about 5 to 14 mg/m$^2$, for example, in an environment at a temperature of 24° C. and a relative humidity of 60%.

A lubricant may be contained in the base material layer 2. Furthermore, the lubricant present on the surface of the base material layer 2 may be the lubricant that is contained in the resin constituting the base material layer 2 and exuded therefrom, or may be the lubricant applied to the surface of the base material layer 2.

From the viewpoint of further improving the moldability, the dynamic friction coefficient of the base material layer 2-side surface of the battery packaging material of the present invention is preferably about 0.5 or less, more preferably about 0.3 or less, and still more preferably about 0.2 or less, for example. The lower limit of the dynamic friction coefficient is about 0.01, for example. Examples of preferred ranges of the dynamic friction coefficient include from about 0.01 to 0.5, from about 0.01 to 0.3, and from about 0.01 to 0.2. The dynamic friction coefficient is the value measured in accordance with the method defined in JIS K7125: 1999.

While the thickness of the base material layer 2 is not particularly limited as long as the base material layer 2 exhibits the function as a base material layer, it is about 3 to 50 μm, and preferably about 10 to 35 μm, for example.

[Adhesive Agent Layer 4]

In the battery packaging material of the present invention, the adhesive agent layer 4 is a layer that is optionally provided between the base material layer 2 and the aluminum alloy foil 1, in order to strongly bond these layers.

The adhesive agent layer 4 is formed of an adhesive capable of bonding the base material layer 2 and the aluminum alloy foil 1. The adhesive to be used for forming the adhesive agent layer 4 may be a two-liquid curable adhesive or a one-liquid curable adhesive. Furthermore, the adhesion mechanism of the adhesive to be used for forming the adhesive agent layer 4 is not particularly limited, and may be any of a chemical reaction type, a solvent volatilization type, a heat melting type, a heat pressing type, and the like.

Specific examples of adhesive components usable for forming the adhesive agent layer 4 include polyester-based resins, such as polyethylene terephthalate, polybutylene terephthalate, polyethylene naphthalate, polybutylene naphthalate, polyethylene isophthalate, and copolyesters; polyether-based adhesives; polyurethane-based adhesives; epoxy-based resins; phenol resin-based resins; polyamide-based resins, such as nylon 6, nylon 66, nylon 12, and copolyamides; polyolefin-based resins, such as polyolefins, carboxylic acid-modified polyolefins, and metal-modified polyolefins; polyvinyl acetate-based resins; cellulose-based adhesives; (meth)acrylic-based resins; polyimide-based resins; polycarbonates; amino resins, such as urea resins and melamine resins; rubbers, such as chloroprene rubber, nitrile rubber, and styrene-butadiene rubber; and silicone-based resins. These adhesive components may be used alone or in combinations of two or more. Among these adhesive components, a polyurethane-based adhesive, for example, is preferred.

The adhesive agent layer 4 may also contain a colorant. When the adhesive agent layer 4 contains a colorant, the battery packaging material can be colored. As the colorant, a known colorant such as a pigment or a dye can be used. As the colorant, a single colorant may be used, or a mixture of two or more colorants may be used.

Specific examples of preferred inorganic pigments include carbon black and titanium oxide. Specific examples of preferred organic pigments include azo-based dyes, phthalocyanine-based dyes, and condensed polycyclic pigments. Examples of azo-based pigments include soluble pigments, such as watching red and carmine 6C; and insoluble azo pigments, such as monoazo yellow, disazo yellow, pyrazolone orange, pyrazolone red, and permanent red. Examples of phthalocyanine-based pigments include bluish or greenish pigments as copper phthalocyanine pigments or non-metal phthalocyanine pigments. Examples of condensed polycyclic pigments include dioxazine violet and quinacridone violet. A pearl pigment, a fluorescent pigment, or the like can also be used as the pigment.

Among the colorants, carbon black is preferred to make the external appearance of the battery packaging material black, for example.

While the average particle diameter of the pigment is not particularly limited, it is about 0.05 to 5 μm, and preferably about 0.08 to 2 μm, for example. The average particle diameter of the pigment is the median diameter measured using a laser diffraction/scattering particle size distribution analyzer.

While the content of the pigment in the adhesive agent layer 4 is not particularly limited as long as the battery packaging material is colored, it is about 5 to 60% by mass, for example.

While the thickness of the adhesive agent layer 4 is not particularly limited as long as the adhesive agent layer 4 exhibits the function as an adhesive layer, it is about 1 to 10 μm, and preferably about 2 to 5 μm, for example.

[Aluminum Alloy Foil 1]

In the battery packaging material, the aluminum alloy foil 1 is a layer that serves to improve the strength of the battery packaging material, as well as prevent the ingress of water vapor, oxygen, light, and the like into the battery. In the present invention, the above-described aluminum alloy foil 1 of the present invention can be used as the aluminum alloy foil 1. Details of the aluminum alloy foil 1 of the present invention are as described above.

The battery packaging material of the present invention has excellent moldability, because the above-described aluminum alloy foil of the present invention is used in the battery packaging material. Note that the thickness X of the aluminum alloy foil 1 can be measured, even in the state where the aluminum alloy foil is laminated in the battery packaging material, by observing a cross section of the battery packaging material. Likewise, the crystal analysis using the EBSD method with respect to a cross section obtained by cutting the aluminum alloy foil in the vertical direction to the rolling direction of the aluminum alloy foil, which is the vertical direction to the surface of the aluminum alloy foil, can be performed even in the state where the aluminum alloy foil is laminated in the battery packaging material. Specific measurement conditions are the same as the above-described analysis conditions for the aluminum alloy foil 1, except that, in the (Pre-treatment) described above, the battery packaging material is embedded in resin, and then cut in the vertical direction to the rolling direction (RD) of the aluminum alloy foil, which is the vertical direction (ND) to the surface of the aluminum alloy foil, to obtain a cross section of the aluminum alloy foil.

[Adhesive Layer 5]

In the battery packaging material of the present invention, the adhesive layer 5 is a layer that is optionally provided between the aluminum alloy foil 1 and the heat-sealable resin layer 3, in order to strongly bond these layers.

The adhesive layer 5 is formed of a resin capable of bonding the aluminum alloy foil 1 and the heat-sealable resin layer 3. As the resin to be used for forming the adhesive layer 5, the same adhesives as those exemplified for the adhesive agent layer 4, in terms of adhesion mechanism, types of adhesive components, and the like, can be used. Furthermore, as the resin to be used for forming the adhesive layer 5, polyolefin-based resins exemplified below for the heat-sealable resin layer 3, such as polyolefins, cyclic polyolefins, carboxylic acid-modified polyolefins, and carboxylic acid-modified cyclic polyolefins, can also be used. From the viewpoint of providing excellent adhesion between the aluminum alloy foil 1 and the heat-sealable resin layer 3, a carboxylic acid-modified polyolefin is preferred, and carboxylic acid-modified polypropylene is particularly preferred, as a polyolefin. That is, the resin constituting the adhesive layer 5 may contain a polyolefin backbone, and preferably contains a polyolefin backbone. The inclusion of a polyolefin backbone in the resin constituting the adhesive layer 5 can be analyzed by, for example, infrared spectroscopy or gas chromatography-mass spectrometry, although the analytical method is not particularly limited. For example, when a maleic anhydride-modified polyolefin is measured by infrared spectroscopy, peaks derived from maleic anhydride are detected at a wavelength of around 1760 $cm^{-1}$ and a wavelength of around 1780 $cm^{-1}$.

Furthermore, from the viewpoint of achieving a battery packaging material having good adhesion, while reducing the thickness of the battery packaging material, the adhesive layer 5 may be a cured product of a resin composition containing an acid-modified polyolefin and a curing agent. Preferred examples of the acid-modified polyolefin include the same carboxylic acid-modified polyolefin and carboxylic acid-modified cyclic polyolefin as exemplified for the heat-sealable resin layer 3.

The curing agent is not particularly limited as long as it cures the acid-modified polyolefin. Examples of the curing agent include an epoxy-based curing agent, a polyfunctional isocyanate-based curing agent, a carbodiimide-based curing agent, and an oxazoline-based curing agent.

The epoxy-based curing agent is not particularly limited as long as it is a compound having at least one epoxy group. Examples of the epoxy-based curing agent include epoxy resins, such as bisphenol A diglycidyl ether, modified bisphenol A diglycidyl ether, novolac glycidyl ether, glycerol polyglycidyl ether, and polyglycerol polyglycidyl ether.

The polyfunctional isocyanate-based curing agent is not particularly limited as long as it is a compound having two or more isocyanate groups. Specific examples of the polyfunctional isocyanate-based curing agent include isophorone diisocyanate (IPDI), hexamethylene diisocyanate (HDI), tolylene diisocyanate (TDI), diphenylmethane diisocyanate (MDI), polymer or isocyanurate forms thereof, mixtures thereof, and copolymers thereof with other polymers.

The carbodiimide-based curing agent is not particularly limited as long as it is a compound having at least one carbodiimide group (—N=C=N—). The carbodiimide-based curing agent is preferably a polycarbodiimide compound having at least two carbodiimide groups.

The oxazoline-based curing agent is not particularly limited as long as it is a compound having an oxazoline backbone. Specific examples of the oxazoline-based curing agent include the Epocros series from Nippon Shokubai Co., Ltd.

From the viewpoint of, for example, improving the adhesion between the aluminum alloy foil 1 and the heat-sealable resin layer 3 by means of the adhesive layer 5, the curing agent may be composed of two or more compounds.

The content of the curing agent in the resin composition that forms the adhesive layer 5 is preferably from about 0.1 to 50% by mass, more preferably from about 0.1 to 30% by mass, and still more preferably from about 0.1 to 10% by mass.

The thickness of the adhesive layer 5 is not particularly limited as long as the adhesive layer 5 exhibits the function as an adhesive layer. When any of the adhesives exemplified for the adhesive agent layer 4 is used, the thickness of the adhesive layer 5 is preferably about 2 to 10 µm, and more preferably about 2 to 5 µm, for example. When any of the resins exemplified for the heat-sealable resin layer 3 is used, the thickness of the adhesive layer 5 is preferably about 2 to 50 µm, and more preferably about 10 to 40 µm, for example. When the cured product of an acid-modified polyolefin and a curing agent is used, the thickness of the adhesive layer 5 is preferably about 30 µm or less, more preferably about 0.1 to 20 µm, and still more preferably about 0.5 to 5 µm, for example. When the adhesive layer 5 is formed of the cured product of a resin composition containing an acid-modified polyolefin and a curing agent, the adhesive layer 5 can be formed by applying the resin composition, and curing the composition by heating or the like.

[Heat-Sealable Resin Layer 3]

In the battery packaging material of the present invention, the heat-sealable resin layer 3 is a layer that corresponds to an innermost layer, and is heat-welded with itself during the assembly of a battery to hermetically seal the battery element.

While the resin component to be used for the heat-sealable resin layer 3 of the present invention is not particularly limited as long as it can be heat-welded, examples thereof include polyolefins and acid-modified polyolefins. That is, the resin constituting the heat-sealable resin layer 3 may contain a polyolefin backbone, and preferably contains a polyolefin backbone. The inclusion of a polyolefin backbone in the resin constituting the heat-sealable resin layer 3 can be analyzed by, for example, infrared spectroscopy or gas chromatography-mass spectrometry, although the analytical method is not particularly limited. For example, when a maleic anhydride-modified polyolefin is measured by infrared spectroscopy, peaks derived from maleic anhydride are detected at a wavelength of around 1760 $cm^{-1}$ and a wavelength of around 1780 $cm^{-1}$. However, if the degree of acid modification is low, the peaks may be so small that they cannot be detected. In that case, the analysis can be performed by nuclear magnetic resonance spectroscopy.

Specific examples of polyolefins include polyethylene, such as low-density polyethylene, medium-density polyethylene, high-density polyethylene, and linear low-density polyethylene; polypropylene, such as homopolypropylene, block copolymers of polypropylene (for example, block copolymers of propylene and ethylene), and random copolymers of polypropylene (for example, random copolymers of propylene and ethylene); and terpolymers of ethylene-butene-propylene. Among these polyolefins, for example, polyethylene and polypropylene are preferred, and polypropylene is more preferred.

The polyolefins may be cyclic polyolefins. A cyclic polyolefin is a copolymer of an olefin and a cyclic monomer. Examples of the olefin as a constituent monomer of the cyclic polyolefin include ethylene, propylene, 4-methyl-1-pentene, butadiene, and isoprene. Examples of the cyclic monomer as a constituent monomer of the cyclic polyolefin include cyclic alkenes, such as norbornene; specifically cyclic dienes, such as cyclopentadiene, dicyclopentadiene, cyclohexadiene, and norbornadiene. Styrene is also included as an example of a constituent monomer. Among the above, for example, a cyclic alkene is preferred, and norbornene is more preferred.

An acid-modified polyolefin is a polymer obtained by modifying the polyolefin by block polymerization or graft polymerization with a carboxylic acid. Examples of the carboxylic acid to be used for the modification include maleic acid, acrylic acid, itaconic acid, crotonic acid, maleic anhydride, and itaconic anhydride.

The acid-modified polyolefin may be an acid-modified cyclic polyolefin. The acid-modified cyclic polyolefin is a polymer obtained by replacing a portion of the monomers constituting the cyclic polyolefin with an α,β-unsaturated carboxylic acid or an anhydride thereof, and copolymerizing them, or by block-polymerizing or graft-polymerizing an α,β-unsaturated carboxylic acid or an anhydride thereof onto the cyclic polyolefin. The cyclic polyolefin to be modified with an acid is the same as described above. The carboxylic acid to be used for the modification is the same as that used for the modification of the acid-modified cycloolefin copolymer.

Among these resin components, for example, a polyolefin is preferred, and a propylene copolymer is more preferred. Examples of the propylene copolymer include copolymers of propylene with other olefins, such as ethylene-propylene copolymer, propylene-butene copolymer, and ethylene-propylene-butene copolymer. From the viewpoint of further improving the insulation properties or durability of the battery packaging material, the proportion of propylene units in polypropylene is preferably about 50 to 100 mol %, and more preferably about 80 to 100 mol %. Furthermore, from the viewpoint of further improving the insulation properties or durability of the battery packaging material, the proportion of ethylene units in polyethylene is preferably about 50 to 100 mol %, and more preferably about 80 to 100 mol %. An ethylene copolymer and a propylene copolymer may each be either a random copolymer or a block copolymer, and is preferably a random propylene copolymer.

The heat-sealable resin layer 3 of the present invention preferably contains polypropylene, and preferably has a layer formed of polypropylene. The heat-sealable resin layer 3 may be formed using one resin component alone, or may be formed using a blend polymer obtained by combining two or more resin components. Furthermore, the heat-sealable resin layer 3 may be composed of only one layer, or two or more layers formed of the same resin component or different resin components.

In the present invention, from the viewpoint of enhancing the moldability of the battery packaging material, a lubricant is preferably present on the surface of the heat-sealable resin layer 3. The lubricant is not particularly limited, and a known lubricant can be used, for example, those exemplified above for the base material layer 2. These lubricants may be used alone or in combinations of two or more. The amount of the lubricant present on the surface of the heat-sealable resin layer 3 is not particularly limited; from the viewpoint of improving the moldability of the battery packaging material, it is preferably about 10 to 50 mg/m$^2$, and more preferably about 15 to 40 mg/m$^2$, for example, in an environment at a temperature of 24° C. and a relative humidity of 60%.

A lubricant may be contained in the heat-sealable resin layer 3. Furthermore, the lubricant present on the surface of the heat-sealable resin layer 3 may be the lubricant that is contained in the resin constituting the heat-sealable resin layer 3 and exuded therefrom, or may be the lubricant applied to the surface of the heat-sealable resin layer 3.

From the viewpoint of further improving the moldability, the dynamic friction coefficient of the heat-sealable resin layer 3-side surface of the battery packaging material of the present invention is preferably about 0.5 or less, more preferably about 0.3 or less, and still more preferably about 0.2 or less, for example. The lower limit of the dynamic friction coefficient is about 0.01, for example. Examples of preferred ranges of the dynamic friction coefficient include from about 0.01 to 0.5, from about 0.01 to 0.3, and from about 0.01 to 0.2. The dynamic friction coefficient is the value measured in accordance with the method defined in JIS K7125: 1999.

The thickness of the heat-sealable resin layer 3 of the present invention is not particularly limited as long as the heat-sealable resin layer 3 exhibits the function as a heat-sealable resin layer; from the viewpoint of improving the moldability, it is about 10 to 40 μm, and preferably about 15 to 40 μm, for example.

[Surface Coating Layer 6]

The battery packaging material of the present invention may optionally include a surface coating layer 6 on the base material layer 2 (opposite to the aluminum alloy foil 1 on the base material layer 2), for the purpose of enhancing the designability, electrolytic solution resistance, scratch resistance, and moldability, for example. The surface coating layer 6 is a layer positioned as an outermost layer upon the assembly of a battery.

The surface coating layer 6 can be formed using, for example, polyvinylidene chloride, a polyester resin, a urethane resin, an acrylic resin, or an epoxy resin. In particular, the surface coating layer 6 is preferably formed using a two-liquid curable resin. Examples of the two-liquid curable resin that forms the surface coating layer 6 include a two-liquid curable urethane resin, a two-liquid curable polyester resin, and a two-liquid curable epoxy resin. An additive may also be blended into the surface coating layer 6.

Examples of the additive include fine particles having a particle diameter of about 0.5 nm to 5 μm. While the material of the additive is not particularly limited, examples thereof include metals, metal oxides, inorganic materials, and organic materials. Furthermore, while the shape of the additive is not particularly limited, examples thereof include a spherical shape, a fibrous shape, a plate shape, an amorphous shape, and a balloon shape. Specific examples of the additive include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acrylics, crosslinked styrene, crosslinked polyethylene, benzoguanamine, gold, aluminum, copper, and nickel. These additives may be used alone or in combinations of two or more. Among these additives, silica, barium sulfate, and titanium oxide, for example, are preferred from the viewpoint of dispersion stability, costs, and the like. The surface of the additive may be subjected to various types of surface treatments, such as an insulation treatment and a dispersibility enhancing treatment.

Examples of the method for forming the surface coating layer 6 include, although not particularly limited to, a method in which a two-liquid curable resin that forms the surface coating layer 6 is applied to one surface of the base material layer 2. When an additive is blended, the additive may be mixed into the two-liquid curable resin, and then the mixture may be applied.

While the content of the additive in the surface coating layer 6 is not particularly limited, it is preferably about 0.05 to 1.0% by mass, and more preferably about 0.1 to 0.5% by mass, for example.

While the thickness of the surface coating layer 6 is not particularly limited as long as the surface coating layer exhibits the above-described function as the surface coating layer 6, it is about 0.5 to 10 m, and preferably about 1 to 5 m, for example.

3. Method for Producing the Battery Packaging Material

The method for producing the battery packaging material of the present invention is not particularly limited as long as a laminate including layers each having a predetermined composition is obtained. A method can be adopted that includes a lamination step of obtaining a laminate including at least a base material layer, an aluminum alloy foil, and a heat-sealable resin layer in this order, wherein the aluminum alloy foil of the present invention is used as the aluminum alloy foil.

One example of the method for producing the battery packaging material of the present invention is as follows: Initially, a laminate including the base material layer 2, the adhesive agent layer 4, and the aluminum alloy foil 1 in this order (the laminate may be hereinafter denoted as the "laminate A") is formed. Specifically, the laminate A can be formed using a dry lamination method as follows: The adhesive to be used for forming the adhesive agent layer 4 is applied to the base material layer 2, or to the aluminum alloy foil 1 whose surface has been optionally subjected to a chemical conversion treatment, using a coating method such as an extrusion method, a gravure coating method, or a roll coating method, and then dried. Then, the aluminum alloy foil 1 or the base material layer 2 is laminated thereon, and the adhesive agent layer 4 is cured.

Next, the adhesive layer 5 and the heat-sealable resin layer 3 are laminated in this order on the aluminum alloy foil 1 of the laminate A. Examples of the method therefor include (1) a method in which the adhesive layer 5 and the heat-sealable resin layer 3 are co-extruded to be laminated on the aluminum alloy foil 1 of the laminate A (co-extrusion lamination method); (2) a method in which a laminate in which the adhesive layer 5 and the heat-sealable resin layer 3 are laminated is separately formed, and this laminate is laminated on the aluminum alloy foil 1 of the laminate A using a thermal lamination method; (3) a method in which the adhesive for forming the adhesive layer 5 is laminated on the aluminum alloy foil 1 of the laminate A by, for example, applying the adhesive onto the aluminum alloy foil 1 using an extrusion method or solution coating, followed by drying at a high temperature and baking, and then the heat-sealable resin layer 3 formed into a sheet in advance is laminated on the adhesive layer 5 using a thermal lamination method; and (4) a method in which the melted adhesive layer 5 is poured between the aluminum alloy foil 1 of the laminate A and the heat-sealable resin layer 3 formed into a sheet in advance, and simultaneously the laminate A and the heat-sealable resin layer 3 are bonded with the adhesive layer 5 sandwiched therebetween (sandwich lamination method).

When the surface coating layer is to be provided, the surface coating layer is laminated on the surface of the base material layer 2 opposite to the aluminum alloy foil 1. The surface coating layer can be formed by, for example, applying the above-described resin that forms the surface coating layer onto the surface of the base material layer 2. The order of the step of laminating the aluminum alloy foil 1 on the surface of the base material layer 2 and the step of laminating the surface coating layer on the surface of the base material layer 2 is not particularly limited. For example, the surface coating layer may be formed on the surface of the base material layer 2, and then the aluminum alloy foil 1 may be formed on the surface of the base material layer 2 opposite to the surface coating layer.

The method for allowing a lubricant to be present on the surface of the base material layer 2 or the heat-sealable resin layer 3 is not particularly limited; examples of the method include a method in which a lubricant is blended into the resin constituting the base material layer 2 or the heat-sealable resin layer 3, and the lubricant is optionally exuded to the surface; and a method in which a lubricant is applied to the surface of the base material layer 2 or the heat-sealable resin layer 3.

In the manner as described above, a laminate is formed that includes the optionally provided surface coating layer 6/the base material layer 2/the optionally provided adhesive agent layer 4/the aluminum alloy foil 1 whose surface has been optionally subjected to a chemical conversion treatment/the adhesive layer 5/the heat-sealable resin layer 3 in this order. The laminate may further be subjected to a heat treatment of a heat-roll contact type, a hot-air type, or a near- or far-infrared radiation type, in order to strengthen the adhesion of the adhesive agent layer 4 and the optionally provided adhesive layer 5. Such a heat treatment may be performed, for example, at about 150 to 250° C. for about 1 to 5 minutes.

In the battery packaging material of the present invention, the layers constituting the laminate may be optionally subjected to a surface activation treatment, such as a corona treatment, a blast treatment, an oxidation treatment, or an ozone treatment, in order to improve or stabilize the film formability, the lamination processing, the suitability for final product secondary processing (pouching and embossing molding), and the like.

4. Use of the Battery Packaging Material

The battery packaging material of the present invention is used as a packaging material for hermetically sealing and housing battery elements such as a positive electrode, a negative electrode, and an electrolyte.

Specifically, a battery element including at least a positive electrode, a negative electrode, and an electrolyte is covered with the battery packaging material of the present invention such that a flange portion (region where the heat-sealable resin layer is brought into contact with itself) can be formed on the periphery of the battery element, while a metal terminal connected to each of the positive electrode and the negative electrode protrudes to the outside. Then, the heat-sealable resin layer in the flange portion is heat-sealed with itself to hermetically seal the battery element. As a result, a battery obtained using the battery packaging material is provided. When the battery packaging material of the present invention is used to house the battery element, it is used such that the heat-sealable resin layer is positioned on the inner side (surface that contacts the battery element) thereof.

The battery packaging material of the present invention may be used for either primary batteries or secondary batteries, preferably secondary batteries. While the type of secondary battery to which the battery packaging material of the present invention is applied is not particularly limited, examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers, and capacitors. Among these secondary batteries, preferred secondary batteries to which the battery packaging material of the present invention is applied include lithium ion batteries and lithium ion polymer batteries.

EXAMPLES

The present invention will be hereinafter described in detail with reference to examples and comparative examples; however, the present invention is not limited to the examples.

Examples 1-7 and Comparative Examples 1-4

A biaxially stretched nylon film (thickness: 25 km) was used as a resin film constituting the base material layer. One surface of the biaxially stretched nylon film had been subjected to a corona treatment. Erucamide was applied, as a lubricant, to the surface of the biaxially stretched nylon film not subjected to the corona treatment (the amount applied was 10 mg/m$^2$). Meanwhile, an adhesive agent layer formed of a two-liquid urethane adhesive composed of a polyester polyol-based base resin and an aromatic isocyanate-based curing agent was applied to the surface of the biaxially stretched nylon film subjected to the corona treatment, such that the thickness of the adhesive agent layer after curing became 3 km. Next, aluminum alloy foils each having the characteristics shown in Table 1 were prepared. The adhesive agent layer-side of the base material layer and the chemical conversion-treated surface of each of the aluminum alloy foils were laminated and bonded together by applying pressure and heat, and then subjected to an aging treatment to prepare a laminate in which the biaxially stretched nylon film/the adhesive agent layer/the aluminum alloy foil were laminated in this order. Note that the chemical conversion treatment of the aluminum alloy foil was performed by applying a treatment solution containing a phenol resin, a chromium fluoride compound, and phosphoric acid to both surfaces of the aluminum alloy foil, using a roll coating method, such that the amount of chromium applied became 10 mg/m$^2$ (dry mass), followed by baking.

Note that the aluminum alloy foils of Examples 1 to 7 and Comparative Examples 1 to 4 were each produced by adjusting the composition, the rolling conditions, and the like, using the above-described known method. These aluminum alloy foils differ in their characteristics shown in Table 1, such as the number average grain diameter. Separately, an acid-modified polypropylene resin (unsaturated carboxylic acid-grafted random polypropylene, which was grafted with an unsaturated carboxylic acid) constituting an adhesive layer and polypropylene (random copolymer) constituting a heat-sealable resin layer were co-extruded to prepare a two-layered co-extruded film composed of a 20-μm-thick adhesive layer and a 20-μm-thick heat-sealable resin layer. Next, the two-layered co-extruded film prepared above was placed over the above-described laminate composed of the biaxially stretched nylon film/the adhesive agent layer/the aluminum alloy foil such that the adhesive layer-side and the aluminum alloy foil-side came into contact with each other, and the resulting material was heated to obtain a laminate in which the base material layer (the biaxially stretched nylon film)/the adhesive agent layer/the aluminum alloy foil/the adhesive layer/the heat-sealable resin layer were laminated in this order. The resulting laminate was cooled and then heat-treated to obtain a battery packaging material.

<Measurement of the Proportion of the Total Area of the {111} Plane, the Number Average Grain Diameter, and the Standard Deviation of the Grain Diameter>

For a cross section in the vertical direction to the rolling direction of each of the aluminum alloy foils used above, crystal analysis was performed using the EBSD method, and the proportion of the total area of the {111} plane, the number average grain diameter, and the standard deviation of the grain diameter of the aluminum alloy foil were measured. Details of the measurement conditions are as described below. The measurement results are shown in Table 1. In the measurement of the number average grain diameter, the maximum grain diameter was measured for reference; as a result, the maximum grain diameter of the aluminum alloy foil of Example 1 was 8.6 μm, and the maximum grain diameter of the aluminum alloy foil of Comparative Example 3 was 12.5 μm. The number average grain diameter is the diameter when the area calculated in accordance with [(measurement region–region having a CI value of 0.1 or less)/number of crystals] is assumed to be a circle; it is the number average grain diameter of crystals contained in a measurement region of about 10,000 μm$^2$ or more, which is formed by connecting a plurality of images obtained by crystal analysis using the EBSD method. The maximum grain diameter is the value measured for the largest crystal of the crystals contained in the measurement region when the shapes of the crystals are assumed to be circles. The standard deviation of the grain diameter was calculated based on the distribution of the grain diameter of crystals (diameter when the crystal area is assumed to be a circle) contained in a measurement region of about 10,000 μm$^2$ or more, which is formed by removing a region having a CI value of 0.1 or less, and then connecting a plurality of images obtained by crystal analysis using the EBSD method.

(Measurement Apparatus)

An apparatus in which an EBSD detector (from TSL Solutions K.K.) had been incorporated into a Schottky field emission scanning electron microscope was used.

(Pre-Treatment)

As a pre-treatment, the aluminum alloy foil was cut in the vertical direction to the rolling direction (RD) to obtain a cross section. The rolling direction of the aluminum alloy foil is a direction in which linear rolling marks extend when the glossy surface of the aluminum alloy foil is observed with a metallurgical microscope. Specific procedures were as follows: Initially, the aluminum alloy foil for use as a sample was cut into 5 mm (vertical direction to the rolling direction)×10 mm (rolling direction) with a trimming razor, and then embedded in resin. Next, using the trimming razor, the aluminum alloy foil was cut, together with the resin, in the vertical direction to the rolling direction of the aluminum alloy foil, which is the vertical direction to the surface of the aluminum alloy foil, to expose a cross section of the aluminum alloy foil. Next, the obtained cross section was trimmed using a microtome (Ultramicrotome from Leica Microsystems GmbH). This trimming involved cutting, with the microtome, the cross section together with the embedding resin through to about 1 mm in the vertical direction to the cross section, in order to reduce mechanical strain of the cross-sectional shape. Next, using an ion milling apparatus (from Hitachi High-Technologies Corporation), a broad argon beam was vertically directed to the cross section for 4 hours at a fly-out width of 50 μm and a voltage of 6 kV, to prepare a measurement cross section. This operation is to precisely expose the cross section of the aluminum alloy foil to minimize the mechanical damage into the crystal structure occurred in the previous step.

(SEM Conditions)

The conditions for the scanning electron microscope (SEM) used in the EBSD method were as follows:

Observation magnification: 2,000 times (the observation magnification standard during photographing was Polaroid 545)

Acceleration voltage: 15 kV

Working distance: 15 mm

Sample inclination angle: 70°

(EBSD Conditions)

The conditions for the crystal analysis using the EBSD method were as follows:

Step size: 200 nm

Analysis conditions:

The crystal orientation analysis software OIM (Ver. 7.3) from TSL Solutions K.K. was used to perform the following analysis.

A plurality of images were connected to form a measurement region of about 10,000 μm or more. At this time, the region from the center to both ends of the aluminum alloy foil in the thickness direction was defined as the measurement region. Any portion of the cross section to which the resin was attached, or any portion where the acid resistance film was present, was excluded from the measurement region.

After the images were connected, a pole figure was observed.

Data whose CI value (Confidence Index: CI value) defined by the crystal orientation analysis software OIM from TSL Solutions K.K. was 0.1 or less was excluded, and then the analysis was performed.

In the calculation of the proportion of the total area of the {111} plane, the analysis was performed with an acceptable angle of 15°.

Figure 8:
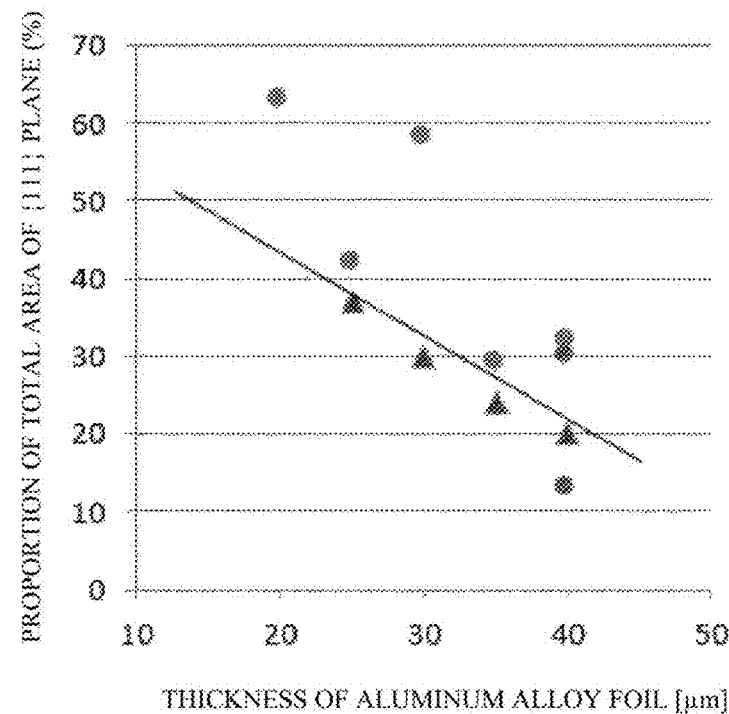
FIG. 8 is a graph showing the relationship between the thickness X (μm) of each of the aluminum alloy foils in examples and comparative examples, and the proportion (%) of the total area of the {111} plane in the total area of crystal planes of the face-centered cubic structure.

FIG. 8 illustrates a graph showing the relationship between the thickness X (μm) of each of the aluminum alloy foils in Examples 1 to 7 and Comparative Examples 1 to 4, and the proportion (%) of the total area of the {111} plane. In FIG. 8, a reference straight line where the proportion (%) of the total area of the {111} plane=−1.1X+66 has been drawn. In FIGS. 8 to 11, ○ shows the results of the examples, and Δ shows the results of the comparative examples.

Figure 9:
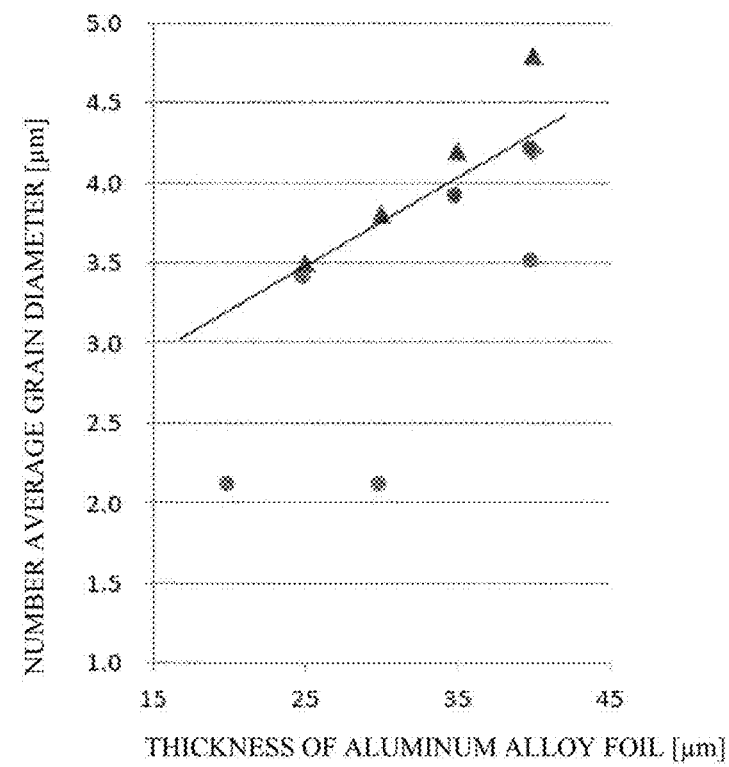
FIG. 9 is a graph showing the relationship between the thickness X (μm) of each of the aluminum alloy foils in examples and comparative examples, and the number average grain diameter (μm).

FIG. 9 illustrates a graph showing the relationship between the thickness X (μm) of each of the aluminum alloy foils in Examples 1 to 7 and Comparative Examples 1 to 4, and the number average grain diameter R (μm). In FIG. 9, a reference straight line where the number average grain diameter R=0.056X+2.0 has been drawn.

Figure 10:
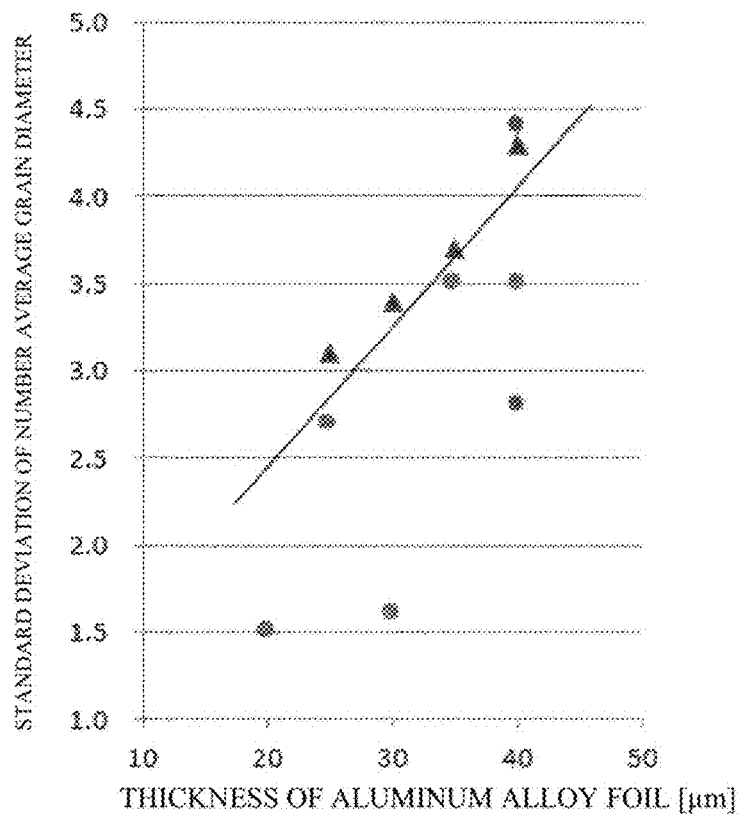
FIG. 10 is a graph showing the relationship between the thickness X (μm) of each of the aluminum alloy foils in examples and comparative examples, and the standard deviation of the grain diameter.

FIG. 10 illustrates a graph showing the relationship between the thickness X (μm) of each of the aluminum alloy foils in Examples 1 to 7 and Comparative Examples 1 to 4, and the standard deviation of the grain diameter. In FIG. 10, a reference straight line where the standard deviation St of the grain diameter=0.09X+0.5 has been drawn.

<Measurement of the Limit Molding Depth>

For each of the battery packaging materials obtained above, ten test samples were prepared by cutting the battery packaging material to prepare strips having a size of 150 mm (TD)×100 mm (MD). Note that MD of the battery packaging material corresponds to the rolling direction (RD) of the aluminum alloy foil, and TD of the battery packaging material corresponds to TD of the aluminum alloy foil. TD corresponds to a perpendicular direction to MD and RD on the same plane. The rolling direction of the aluminum alloy foil can be identified by the rolling marks of the aluminum alloy foil. As a mold, a straight mold was used which was constituted of a rectangular punch having a size of 30 mm (MD)×50 mm (TD) and a die having a clearance of 0.5 mm from the punch. Each of the above-described test samples was placed on the die such that the heat-sealable resin layer-side was positioned on the punch. Each of the ten test samples for each battery packaging material was cold-formed (draw-in one-step molding) while pressing the test sample at a surface pressure of 0.1 MPa, so as to achieve a predetermined molding depth. Each of the test samples after the cold forming was checked whether pinholes or cracks developed in the aluminum alloy foil, by directing light to the test sample with a penlight in a dark room, and allowing light to pass through. Assuming that A mm is the deepest molding depth at which no pinholes or cracks developed in the aluminum alloy foil in all the ten test samples, and B is the number of test samples in which pinholes or the like developed at the shallowest molding depth where pinholes or the like developed in the aluminum alloy foil, the value calculated in accordance with the equation shown below was determined as the limit molding depth of the battery packaging material. The results are shown in Table 1.

Limit molding depth=$A$ mm+(0.5 mm/10)×(10−$B$)

<Evaluation of Moldability>

Figure 11:
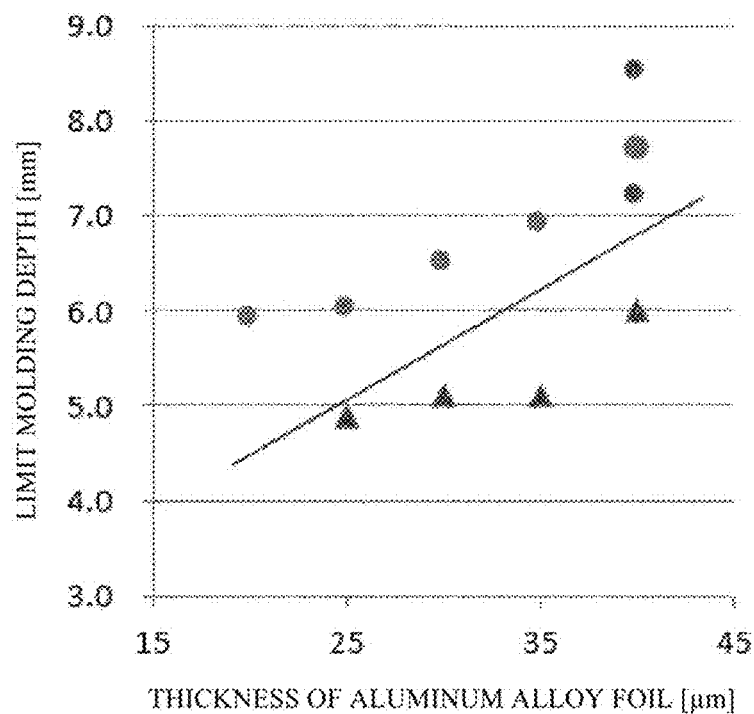
FIG. 11 is a graph showing the relationship between the thickness X (μm) of each of the aluminum alloy foils in examples and comparative examples, and the limit molding depth (min).

The relationship between the limit molding depth of each of the battery packaging materials of Examples 1 to 7 and Comparative Examples 1 to 4, and the thickness X (μm) of the aluminum alloy foil was plotted in the graph shown in FIG. 11. Because the limit molding depth varies depending on the thickness of the aluminum alloy foil, the following two criteria were set for the molding depth, in order to evaluate the moldability independently of the thickness. FIG. 11 shows the reference criterion line of the following criterion 2.

molding depth (mm)=thickness $X$ (μm) of the aluminum alloy foil×0.14+2    Criterion 1:

molding depth (mm)=thickness $X$ (μm) of the aluminum alloy foil×0.12+2    Criterion 2:

Based on these criteria 1 and 2, the moldability of each of the battery packaging materials of Examples 1 to 7 and Comparative Examples 1 to 4 was evaluated in accordance with the criteria shown below. The results are shown in Table 1.

limit molding depth (mm)≥thickness $X$ (μm) of the aluminum alloy foil×0.14+2    a:

thickness $X$ (μm) of the aluminum alloy foil×0.14+2>limit molding depth (mm)≥thickness $X$ (μm) of the aluminum alloy foil×0.12+2    b:

thickness $X$ (μm) of the aluminum alloy foil×0.12+2>limit molding depth (mm)    c:

TABLE 1

| | Aluminum Alloy Foil | | | | Battery Packaging Material | |
|---|---|---|---|---|---|---|
| | | Grain Diameter | | Proportion | | |
| | Thickness X (μm) | Number Average Grain Diameter (μm) | Standard Deviation | of the Total Area of the {111} Plane (%) | Limit Molding Depth (μm) | Evaluation of Moldability |
| Example 1 | 20 | 2.1 | 1.5 | 63 | 5.9 | a |
| Example 2 | 25 | 3.4 | 2.7 | 42 | 6.0 | a |
| Example 3 | 30 | 2.1 | 1.6 | 58 | 6.3 | a |
| Example 4 | 35 | 3.9 | 3.5 | 29 | 6.9 | a |
| Example 5 | 40 | 4.2 | 3.5 | 32 | 7.7 | a |
| Example 6 | 40 | 3.5 | 2.8 | 30 | 8.5 | a |
| Example 7 | 40 | 4.2 | 4.4 | 13 | 7.2 | b |
| Comparative Example 1 | 25 | 3.5 | 3.1 | 32 | 4.9 | c |
| Comparative Example 2 | 30 | 3.8 | 3.4 | 30 | 5.1 | c |
| Comparative Example 3 | 35 | 4.2 | 3.7 | 24 | 5.1 | c |
| Comparative Example 4 | 40 | 4.8 | 4.3 | 20 | 6.0 | c |

The results shown in Table 1 reveal that all the battery packaging materials obtained using the aluminum alloy foils of Examples 1 to 7, wherein, with respect to the cross section obtained by cutting the aluminum alloy foil in the vertical direction to the rolling direction of the aluminum alloy foil, which is the vertical direction to the surface of the aluminum alloy foil, the proportion of the total area of the {111} plane in the total area of crystal planes of the face-centered cubic structure, obtained by performing crystal analysis using the EBSD method, is 10% or more; and with respect to the cross section, the number average grain diameter R of crystals in the face-centered cubic structure, obtained by performing crystal analysis using the EBSD method, satisfies the condition: "number average grain diameter R≤0.056X+2.0", have excellent moldability.

On the other hand, all the battery packaging materials of Comparative Examples 1 to 4, wherein the proportion of the total area of the {111} plane is 10% or more, but the number average grain diameter R does not satisfy the condition "number average grain diameter R≤0.056X+2.0", are inferior in moldability to the battery packaging materials of the examples.

REFERENCE SIGNS LIST

1: aluminum alloy foil
1a: cross section
2: base material layer
3: heat-sealable resin layer
4: adhesive agent layer
5: adhesive layer
6: surface coating layer
10: battery packaging material
T: rolling marks

The invention claimed is:

1. An aluminum alloy foil for a battery packaging material, wherein:
with respect to a cross section obtained by cutting the aluminum alloy foil in a vertical direction that is perpendicular to both a rolling direction of the aluminum alloy foil and a surface of the aluminum alloy foil, a proportion of a total area of a {111} plane in a total area of crystal planes of a face-centered cubic structure, obtained using an EBSD method, is 10% or more; and
with respect to the cross section, a number average grain diameter R of crystals in the face-centered cubic structure, obtained using the EBSD method, satisfies the following equation:

number average grain diameter $R \leq 0.056X+2.0$, where:
X is a thickness of the aluminum alloy foil,
R and X are measured in μm, and
the upper limit of the R value is 4.5 μm.

2. The aluminum alloy foil for a battery packaging material according to claim 1, wherein the thickness X of the aluminum alloy foil is in the range of from 3 to 30 μm.

3. An aluminum alloy foil for a battery packaging material, wherein:
the aluminum alloy constituting the aluminum alloy foil has a composition as defined in
JIS H4160: 1994 A8021H-O,
JIS H4160: 1994 A8079H-O,
JIS H4000: 2014 A8021P-O, or
JIS H4000: 2014 A8079P-O;
with respect to a cross section obtained by cutting the aluminum alloy foil in a vertical direction that is perpendicular to both a rolling direction of the aluminum alloy foil and a surface of the aluminum alloy foil, a proportion of a total area of a {111} plane in a total area of crystal planes of a face-centered cubic structure, obtained using an EBSD method, is 10% or more; and
with respect to the cross section, a number average grain diameter R of crystals in the face-centered cubic structure, obtained using the EBSD method, satisfies the following equation:

number average grain diameter $R \leq 0.056X+2.0$, where:
X is a thickness of the aluminum alloy foil, and
R and X are measured in μm.

4. The aluminum alloy foil for a battery packaging material according to claim 3, wherein the thickness X of the aluminum alloy foil is in the range of from 3 to 30 μm.

5. An aluminum alloy foil for a battery packaging material, wherein:
a thickness X of the aluminum alloy foil is 80 μm or less;
with respect to a cross section obtained by cutting the aluminum alloy foil in a vertical direction that is perpendicular to both a rolling direction of the aluminum alloy foil and a surface of the aluminum alloy foil, a proportion of a total area of a {111} plane in a total area of crystal planes of a face-centered cubic structure, obtained using an EBSD method, is 10% or more; and
with respect to the cross section, a number average grain diameter R of crystals in the face-centered cubic structure, obtained using the EBSD method, satisfies the following equation:

number average grain diameter $R \leq 0.056X+2.0$, where R and X are measured in μm.

6. The aluminum alloy foil for a battery packaging material according to claim 5, comprising iron.

7. The aluminum alloy foil for a battery packaging material according to claim 5, wherein the thickness X of the aluminum alloy foil is in the range of from 3 to 30 μm.

8. The aluminum alloy foil for a battery packaging material according to claim 5, comprising, on the surface, an acid resistance film containing a cerium compound.

9. The aluminum alloy foil for a battery packaging material according to claim 5, comprising, on the surface, an acid resistance film containing at least one element selected from the group consisting of phosphorus, chromium, and cerium.

10. The aluminum alloy foil for a battery packaging material according to claim 5, comprising, on the surface, an acid resistance film containing at least one selected from the group consisting of a phosphorus compound salt, a chromium compound, a fluorine compound, and a triazine-thiol compound.

11. The aluminum alloy foil for a battery packaging material according to claim 5, comprising, on the surface, an acid resistance film, wherein
when analysis of the acid resistance film is performed using time-of-flight secondary ion mass spectrometry, a peak derived from at least one of $Ce^+$ and $Cr^+$ is detected.

12. The aluminum alloy foil for a battery packaging material according to claim 5, wherein a standard deviation St of a grain diameter satisfies the following equation:

standard deviation St of the grain diameter $\leq 0.09X+0.5$.

13. The aluminum alloy foil for a battery packaging material according to claim 5, wherein the percentage of the total area of the {111} plane in the total area of crystal planes of the face-centered cubic structure satisfies the following equation:

percentage of the total area of the {111} plane in the total area of crystal planes of the face-centered cubic structure ≥−1.1$X$+66.

14. A battery packaging material comprising a laminate comprising at least a base material layer, the aluminum alloy foil for a battery packaging material according to claim 5, and a heat-sealable resin layer in this order.

15. A battery comprising a battery element comprising at least a positive electrode, a negative electrode, and an electrolyte, the battery element being housed in a packaging material formed of the battery packaging material according to claim 14.

* * * * *